United States Patent [19]

Mashinsky

[11] Patent Number: 6,088,436
[45] Date of Patent: Jul. 11, 2000

[54] AUTOMATED CALLBACK SYSTEM

[75] Inventor: Alexander Mashinsky, New York, N.Y.

[73] Assignee: ANIP, Inc., Carson City, Nev.

[21] Appl. No.: 08/811,071

[22] Filed: Mar. 3, 1997

Related U.S. Application Data

[63] Continuation-in-part of application No. 08/728,670, Oct. 10, 1996, Pat. No. 5,710,809, which is a continuation of application No. 08/320,269, Oct. 11, 1994, abandoned, and a continuation-in-part of application No. 08/369,376, Jan. 6, 1995, Pat. No. 5,694,464.

[51] Int. Cl.⁷ .................................................. H04M 3/42
[52] U.S. Cl. ........................................... 379/207; 379/229
[58] Field of Search .................................. 379/207, 219, 379/220, 221, 222, 229, 230, 242, 243, 244, 268, 272, 273, 274

[56] References Cited

U.S. PATENT DOCUMENTS

| | | | |
|---|---|---|---|
| 4,594,477 | 6/1986 | Noirot | 179/18 AD |
| 5,012,515 | 4/1991 | McVitie | 380/49 |
| 5,163,042 | 11/1992 | Ochiai | 370/17 |
| 5,353,331 | 10/1994 | Emery et al. | 379/58 |
| 5,526,413 | 6/1996 | Cheston, III et al. | 379/201 |
| 5,606,602 | 2/1997 | Johnson et al. | 379/115 |
| 5,608,786 | 3/1997 | Gordon | 379/100 |
| 5,706,507 | 1/1998 | Schloss | 395/615 |
| 5,771,279 | 6/1998 | Cheston, III et al. | 379/93.17 |
| 5,790,642 | 8/1998 | Taylor et al. | 379/112 |

FOREIGN PATENT DOCUMENTS

| | | |
|---|---|---|
| WO 92/01350 | 1/1992 | WIPO . |
| WO 93/16543 | 8/1993 | WIPO . |
| WO 93/16546 | 8/1993 | WIPO . |
| WO 94/28683 | 12/1994 | WIPO . |

OTHER PUBLICATIONS

Tao et al., "Internet Access via Baseband and Broadband ISDN Gateways", Dec. 4, 1994, (IEEE).

Book Review, Impact of Liberalization On Resale And Callback, Telecommunications Policy, vol. 21, No. 3, pp. 275–276 (1997).

Brennan, Industry Parallel Interconnection Agreements, Information Economics and Policy vol. 9, No. 2, pp. 133–149 (1997).

Globerman et al., Competition In Public Long–distance Telephone Markets In Canada, Telecommunications Policy, vol. 17, No. 4, pp. 297–312 (1993).

*Primary Examiner*—Scott Weaver
*Attorney, Agent, or Firm*—Pennie & Edmonds LLP

[57] ABSTRACT

A seamless automated callback system is disclosed. The system utilizes first and second telecommunication nodes connected to each other by a data line and additionally connected to a conventional telephone network. When a call is placed via the callback system, the first node transmits to the caller an appropriate ring tone for the called location and concurrently requests a callback from the second node via the data line. The second node places the callback which is not immediately answered by the first node. Concurrently, or after a suitable delay, the second node places a call to the called telephone. If the called party answers the call, the second node signals the first node via the data line to answer the callback and connect the caller to the called party. If, however, the call results in a busy signal, an operator intercept, or a ring no answer, the callback is terminated before any telephone toll charges are incurred. In a second preferred embodiment, the system may comprise a network of telecommunications nodes and a server node for coordinating calls between any two nodes in the network. When a call is placed, the system calculates a cost-efficient routing path for the call, and connects the calling telephone to the called telephone via that route. In a third preferred embodiment, one or more transit nodes are predesignated to handle all calling traffic between a first and second node.

21 Claims, 25 Drawing Sheets

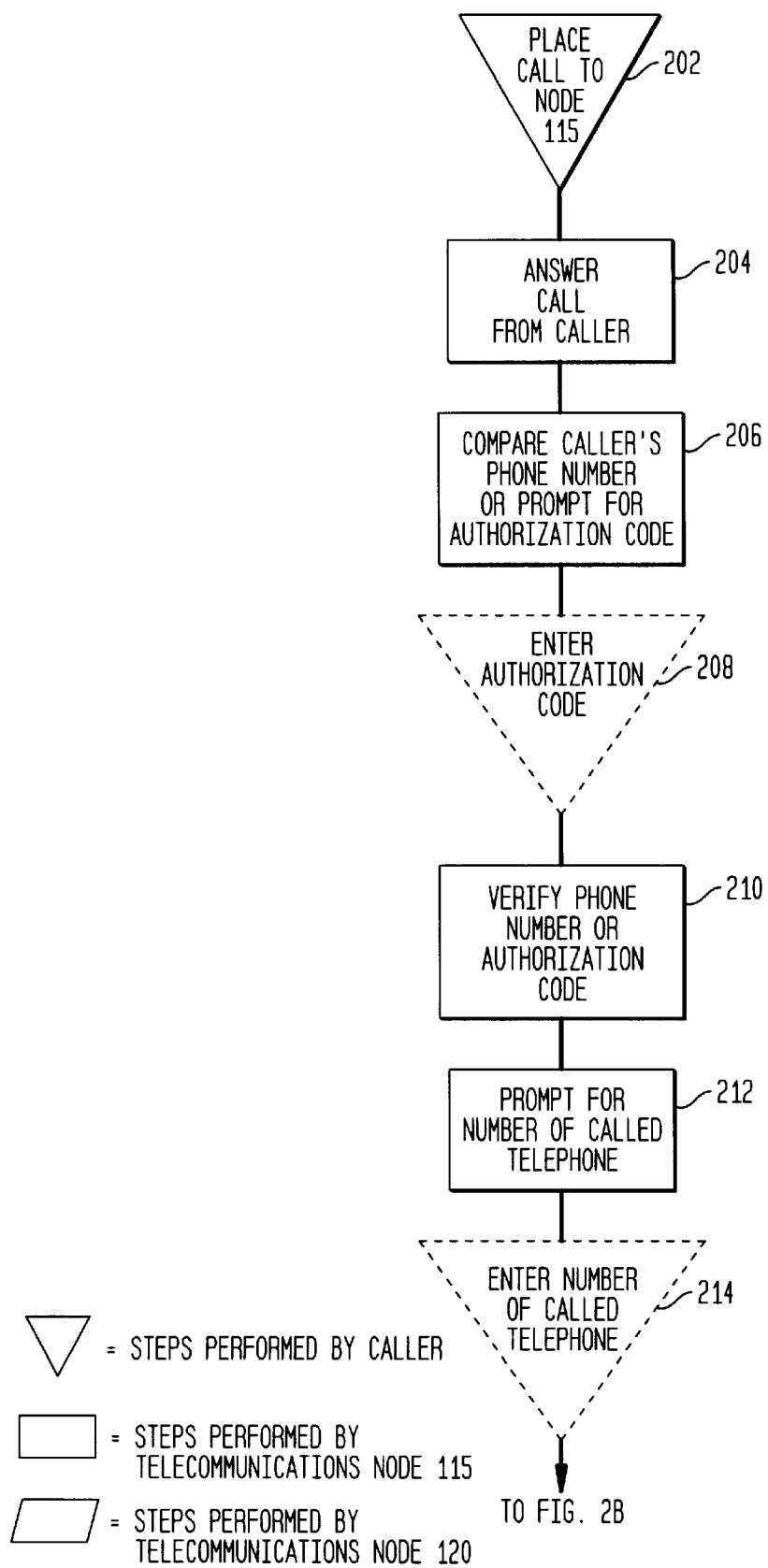

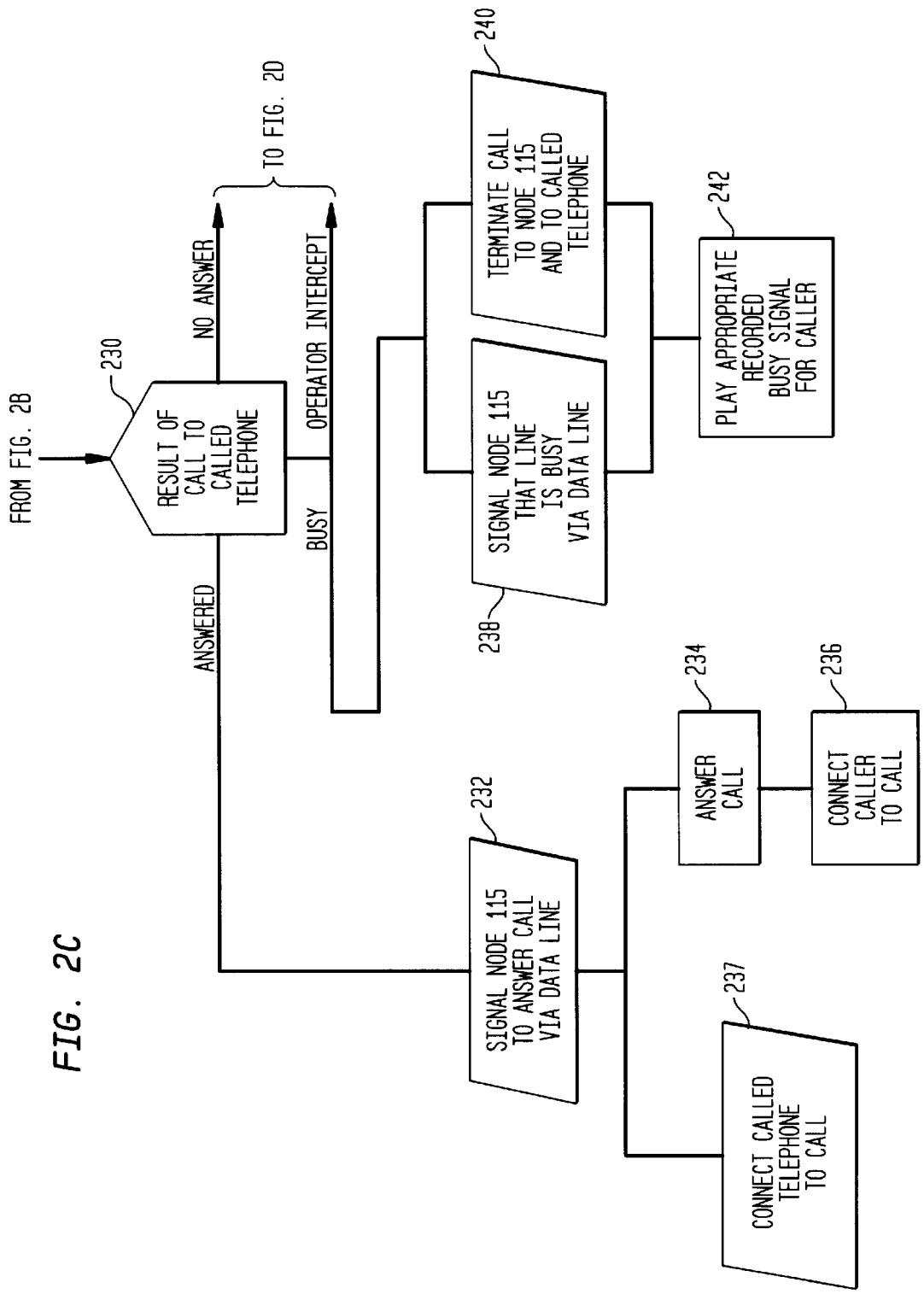

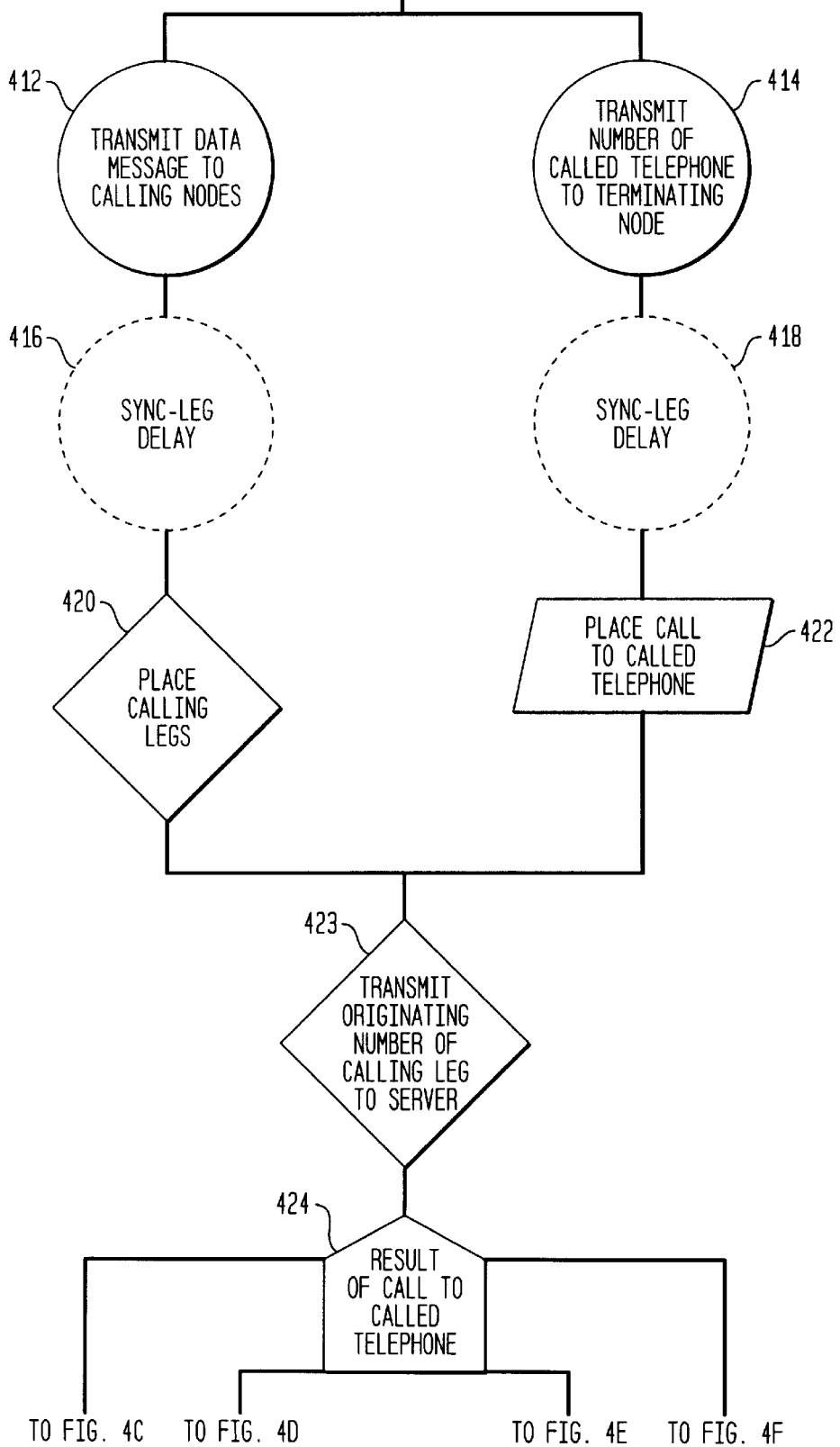

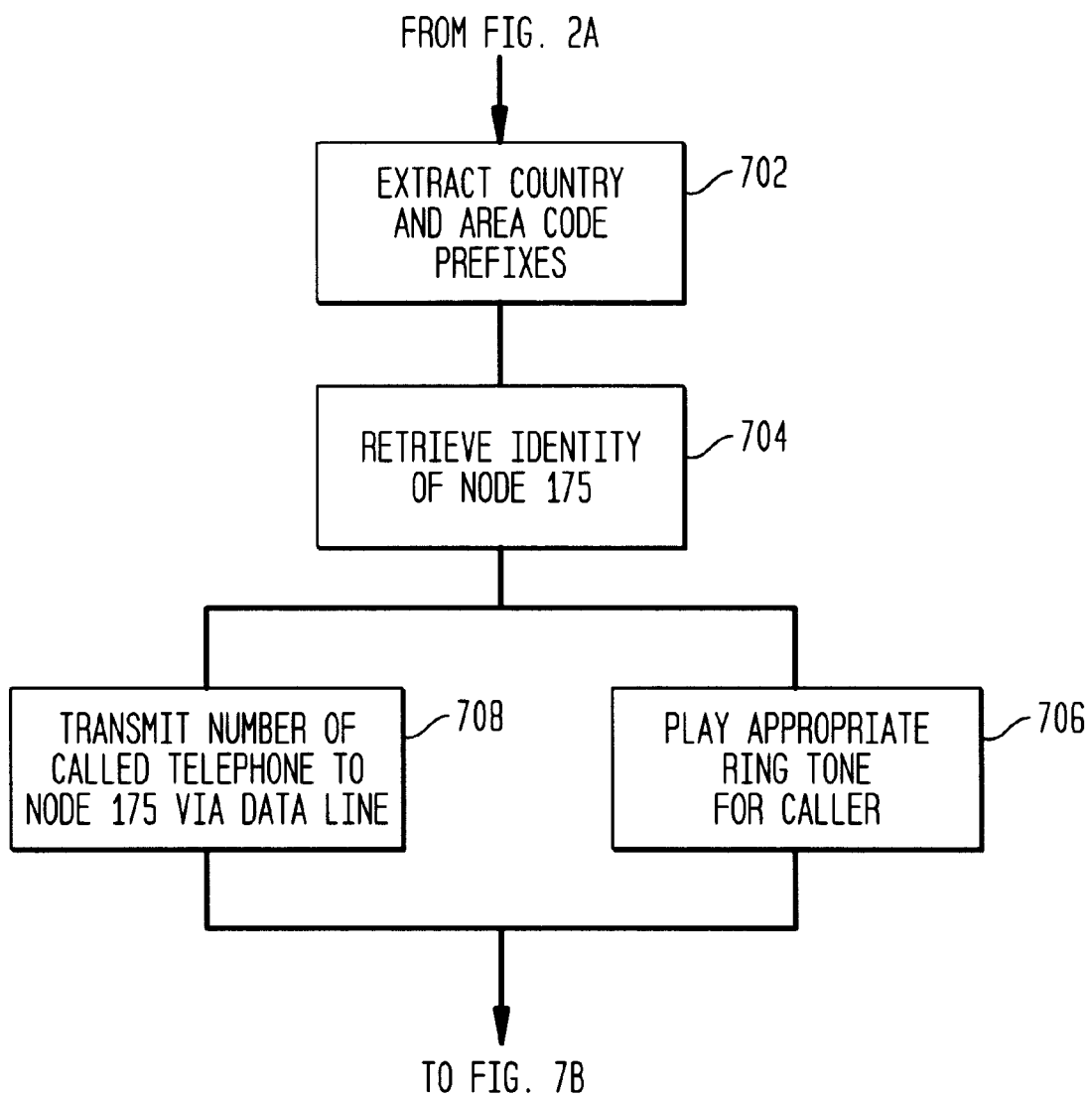

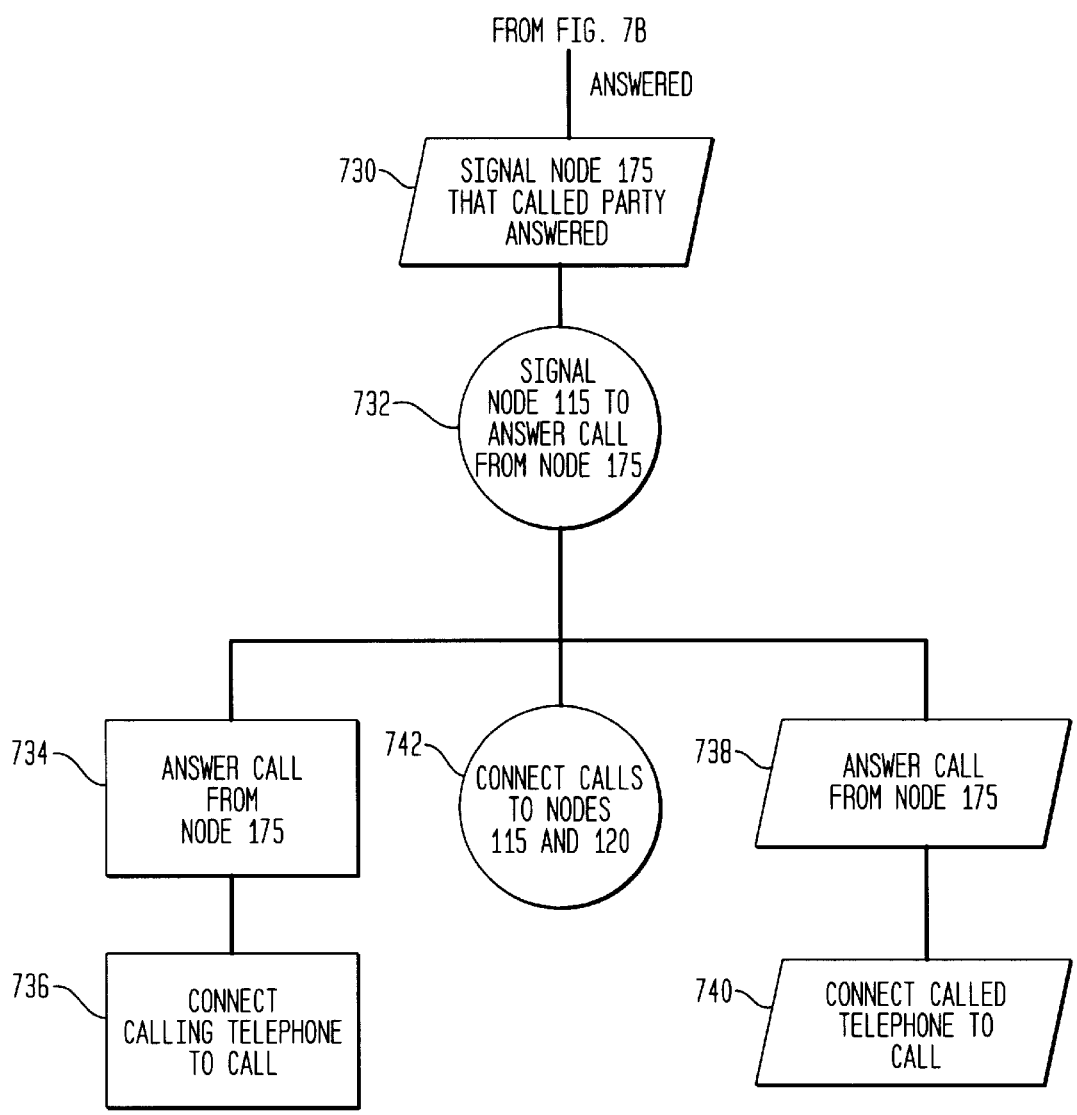

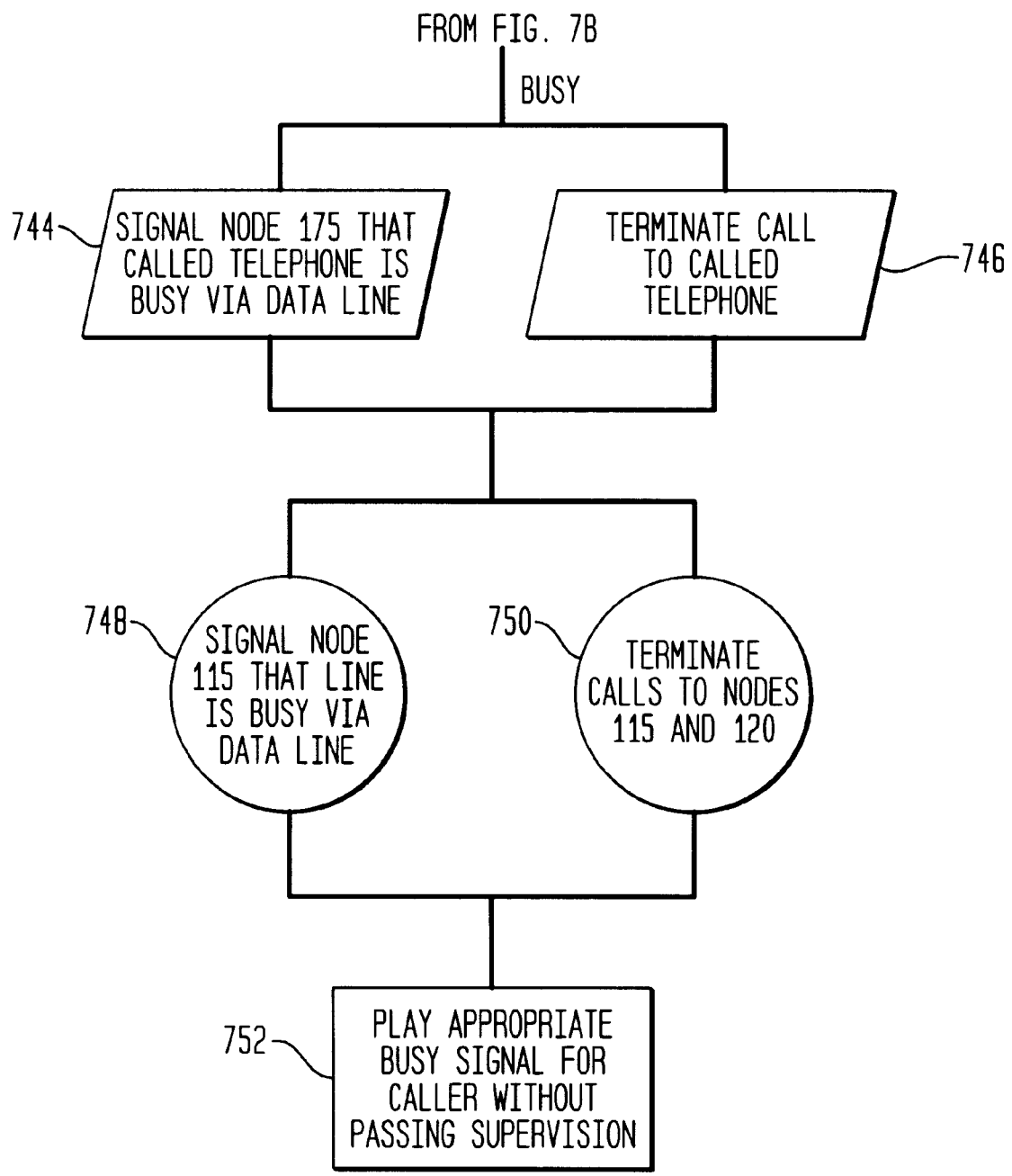

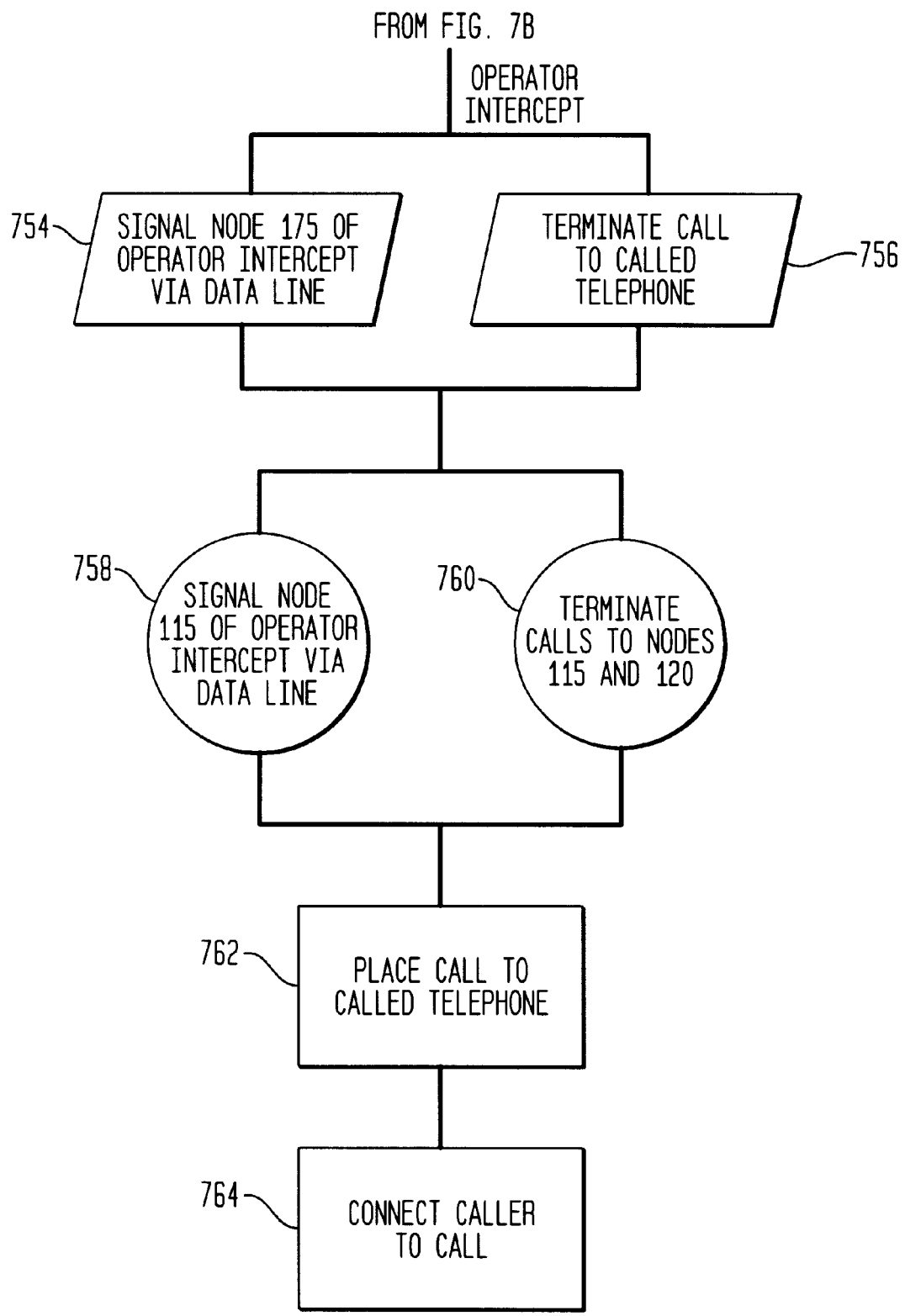

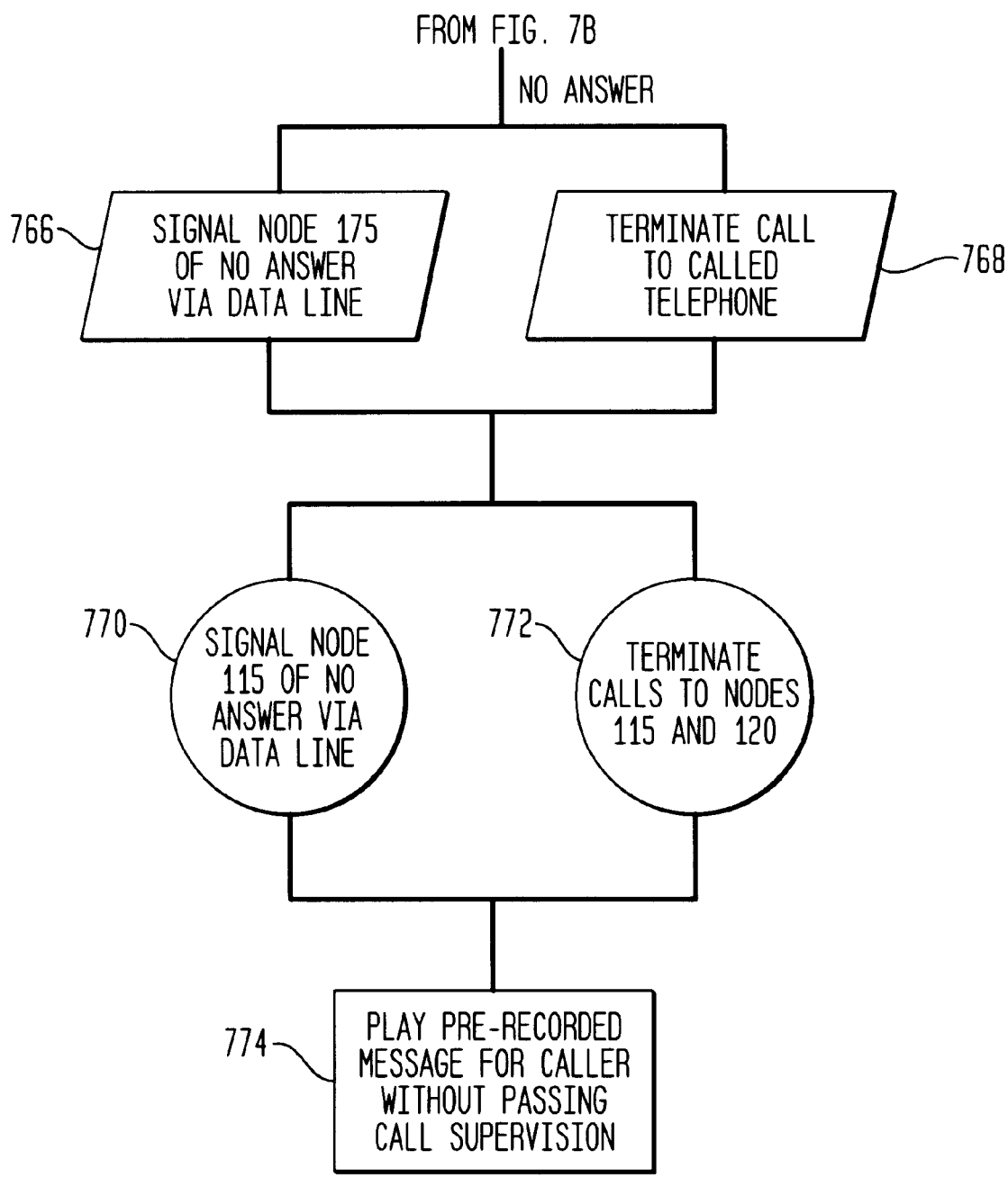

AUTOMATED CALLBACK SYSTEM

CROSS-REFERENCE TO COPENDING APPLICATIONS

This is a continuation-in-part of (1) U.S. patent application Ser. No. 08/728,670 filed Oct. 10, 1996, now U.S. Pat. No. 5,710,809 which is a continuation of 08/320,269, filed Oct. 11, 1994, now abandoned, and (2) U.S. patent application Ser. No. 08/369,376, filed Jan. 6, 1995 now U.S. Pat. No. 5,699,464.

BACKGROUND OF THE INVENTION

Point-to-point reverse direction phonecalling systems (also known as callback systems) are known in the art. In such systems, when a caller located at a calling telephone dials the number of a called telephone, the system transmits a data message over the telephone network to a remote node instructing the node to place a callback to the calling location. The caller then hangs up. The remote node initiates calls to both the calling telephone and the called telephone and connects these two calls together. Such systems provide considerable savings when the call cost from the calling location to the called location is higher than the call cost from the called location to the calling location, as is often the case with respect to international phone communications.

A long standing problem in the area of callback technology has been that a considerable portion of the period between initiation of a phone call and either completion thereof or determination that the call cannot be completed (because of a no answer or busy signal) has traditionally been treated as non-billable in nature. For example, billing protocols, as they have evolved over time, both in the United States and abroad, only permit billing to the ultimate customer for the period between call completion and call termination as perceived by the ultimate customer. In other words, under such established billing protocols, the ultimate customer cannot be charged for the system time required to ring the called location to determine if the call can be completed. Further, such phone calls do not permit billing for the time between the termination of the phone call as perceived by the caller and the actual stand down time or reset time for the public switched service network. One disadvantage of prior art callback systems has therefore been that when the callback from the central switch to the calling location is successful, but the called party cannot be reached for some reason, the caller cannot be charged for the cost of the callback since the call did not result in a successful connection to the called party. The cost of the callback must instead be born by the company providing the callback service.

In addition, certain environments present unique challenges to implementing a callback system. For example, in a hotel environment, a guest at the hotel has no means of answering a callback directly since the callback must be received by an operator who must know in advance who the call is for and where to transfer it to. This difficulty, plus other factors relative to billing procedures in hotels, has prevented most major hotels from employing international callback services. Similar problems are encountered by other large facilities such as hospitals, industrial installations, governmental sites and telephone companies themselves.

Another problem which can increase the cost of operating a callback system is that of reverse answer supervision after a call termination, or the lack thereof. That is, without a call completion signal after call termination transmitted back from the calling location to the originating switch which placed the callback, it can be difficult for the originating switch to know when a call is finished. As a result, the originating switch may maintain the callback connection after the caller has terminated his call. This can have devastating consequences to the callback operator who may incur charges for callback time which cannot be passed on to the caller.

The invention disclosed in U.S. patent application Ser. No. 08/320,269, filed on Oct. 11, 1994 (the '269 application), provides a solution to the above problems and, additionally, provides a means by which hotels, and other similarly situated establishments, can make use of international callback technology and, further, can do so on a more profitable basis than had been available to any prior user of such technology.

The method disclosed in that application comprises in part the steps of transmitting the identification numbers of a calling party and a called party to a central switching unit which then interrogates the called location to obtain the call supervision status thereof. If the call status is that of an answer, the central switching unit completes a first phonecall from the switching unit to the called location and originates a second phone call through the telecommunications network to the calling location. Upon completion of both phone calls, the two are teleconferenced, thereby placing the calling and called parties in communication with each other. However, if the call status at the called-location is that of a no answer or busy, an uncompleted call status signal is provided to the central switching unit. Thereafter, the central switching unit either transmits a call status signal through said independent transception channel to the local communications node to inform the calling location that the call cannot be completed or, alternatively, the central switching unit sends no status signal whatsoever. In the latter case, a predetermined interval of silence from the central switching unit is interpreted by the local communications node to mean that the call could not be completed. The system then sends an appropriate advisory to the calling party.

While the invention disclosed in the '269 application represents a significant improvement over the prior art, it does not adequately solve all problems associated with callback technology. Specifically, because the system disclosed in the '269 application does not initiate the callback until the called telephone has been answered, a delay must be endured while the system establishes the callback connection to the calling location.

Moreover, in the system disclosed in the '269 application, the callback experience may at times not identically match that of a call placed directly from the calling telephone to the called telephone. For example, in the system disclosed in the '269 application, when the called telephone is busy, the caller receives a message to that effect rather than hearing the appropriate busy signal for the called location as he would had the call been placed directly from the calling telephone to the called telephone.

This is important because certain telephone operators may not use the callback system if it alters the calling experience in any way.

SUMMARY AND OBJECTS OF THE INVENTION

It is therefore an object of the present invention to provide an automated callback system in which the delay in establishing a connection between a calling party and a called party is minimized.

It is a further object of the present invention to provide an automated callback system in which the callback provider does not incur any callback charges which cannot be passed along to the caller.

It is a further object of the present invention to provide an automated callback system in which the callback experience matches the experience of a call made directly from the calling telephone to the called telephone.

In a first preferred embodiment of the invention, these and other objects of the invention are achieved by a seamless automated callback system comprising first and second telecommunication nodes connected to first and second telephone switches, respectively. The two telephone switches form part of a conventional telephone network. The two telecommunication nodes are additionally connected to each other via a data line.

When a caller desires to place a call from a telephone served by the first telephone switch to a telephone served by the second telephone switch, the system establishes a first connection between the calling telephone and the first telecommunications node via the first telephone switch. The first telecommunication node concurrently plays for the caller a ring tone appropriate for the called telephone and transmits to the second telecommunication node via the data line the number of the called telephone.

The second telecommunication node places a callback to the first telecommunications node via the second and first telephone switches, and concurrently, or after a suitable delay, places a call to the called telephone. The first telecommunication node does not immediately answer the callback from the second telecommunication node.

If the call to the called telephone is answered, the second telecommunication node signals the first telecommunication node via the data line to answer the callback and to connect the callback to the calling telephone.

If the call to the called telephone results in a busy signal, the second telecommunication node signals an indication of that result to the first telecommunication node via the data line, and the first telecommunication node transmits to the calling telephone an appropriate busy signal for the called location, without answering the callback.

If the call to the called telephone results in an operator intercept, the second telecommunications node signals an indication of that result to the first telecommunication node via the data line, and the first telecommunication node places a call directly to the called telephone and connects the calling telephone to that call.

If the call to the called telephone results in no answer for some predetermined time, the second telecommunication node signals an indication of that result to the first telecommunication node via the data line, and the first telecommunication node replaces the ring tone played to the caller with a pre-recorded message such as one that informs the caller that there is no answer and asks the caller to try the call again at a later time. Other messages may also be used.

In a second preferred embodiment, the system may comprise a network of telecommunications nodes and a server node for coordinating calls between any two nodes in the network. When a call is placed, the system determines a cost-efficient routing path for the call, and connects the calling telephone to the called telephone via that route.

In a third preferred embodiment, one or more transit nodes may be predesignated to handle all calling traffic between any two nodes in the network, instead of calculating a cost-efficient least cost routing path for each call as it is made.

In a fourth preferred embodiment, a system and method for efficiently connecting customers to an on-line service is disclosed. The system comprises a telecommunication node and a plurality of gateways to the on-line service. When a customer desires to access the on-line service, he dials up the telecommunication node and transmits to the telecommunication node his telephone number and other identifying information. The connection to the telecommunication node is then terminated. The telecommunication node identifies the gateway nearest to the customer, and transmits a data query to the gateway requesting that the gateway call back the customer and provide the customer with access to the on-line service.

While the preferred embodiments are described in terms of a calling telephone and a called telephone, it will be understood that the invention may be practiced using all manner of telephone user equipment. By way of example, but not limitation, this telephone user equipment may include answering machines, fax machines, local switches (such as in hotels or offices), voice synthesis/recognition equipment, dialers, answering services, and computers.

BRIEF DESCRIPTION OF THE DRAWINGS

The above objects and summary of the invention will be better understood when taken in conjunction with the following detailed description and accompanying drawings in which:

FIGS. 2A–D are a flowchart depicting the operation of the seamless automated callback system of the present invention.

FIGS. 4A–F are a flowchart depicting the operation of the second preferred embodiment of the present invention;

FIGS. 7A–F are a flowchart depicting operation of the third preferred embodiment of the present invention;

DETAILED DESCRIPTION OF THE PREFERRED EMBODIMENTS

Figure 1:
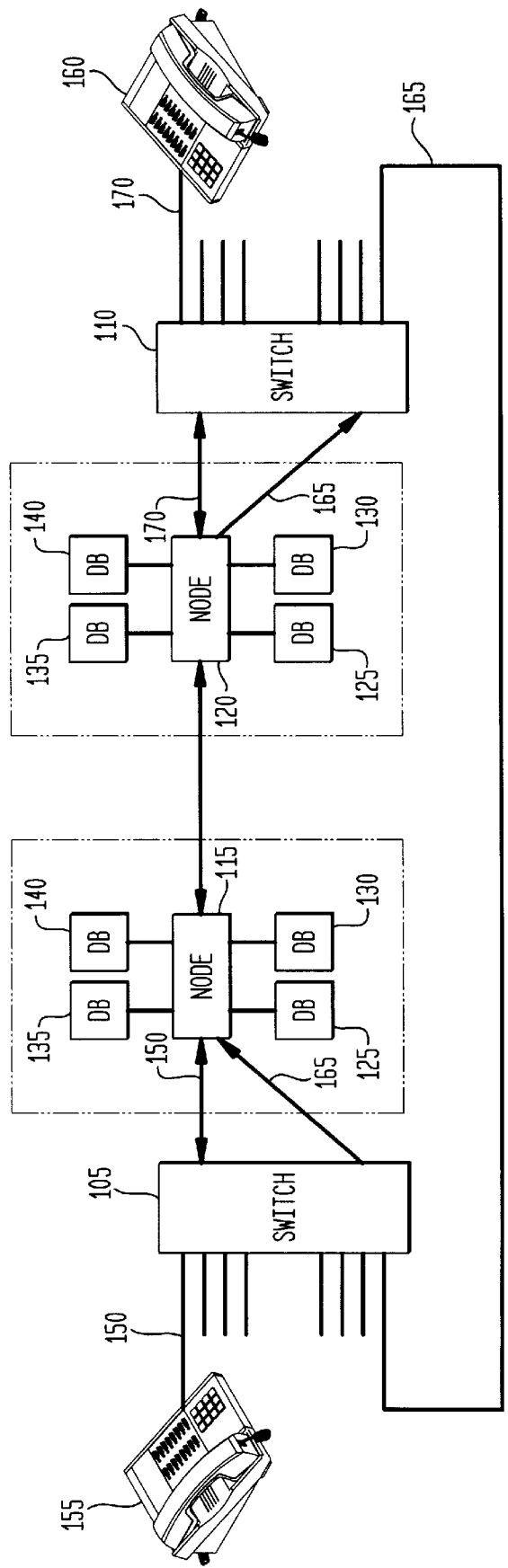
FIG. 1 is a block diagram of a telephone system architecture suitable for implementing the seamless automated callback system of the present invention.

Referring to the drawings, FIG. 1 shows a telephone system architecture suitable for implementing the seamless automated callback system of the present invention. As shown in FIG. 1, the architecture preferably comprises a first telephone switch 105 located in a first location and a second telephone switch 110 located in a location remote from the first location. Switches 105 and 110 illustratively are standard electronic telephone switches such as the AXE10 available from L. M. Ericsson or the DMS100 available from Northern Telecom. Generally, switches 105 and 110 constitute part of the telephone networks owned and maintained by the local telephone authorities in the first and remote locations, respectively. Individual subscriber telephones 155, 160 of conventional nature are connected to switches 105, 110 respectively by conventional wired or wireless lines schematically represented by lines 150, 170, respectively. Switches 105 and 110 are connected by conventional wired or wireless networks, such as the public switched telephone network, schematically represented by line 165.

Also shown in FIG. 1 are an originating telecommunication node 115 adapted to place and receive calls through switch 105 and a terminating telecommunication node 20 120 adapted to place and receive calls through switch 110. In a preferred embodiment, telecommunication nodes 115 and 120 are computer-based local telecommunication nodes capable of creating a connection between two remote parties each of whom is independently connected to the node via a telephone voice line. One example of a telecommunication node suitable for the purposes of the present invention is the CLN (TM) telecommunications node made by Smartnet Corporation.

Telecommunication nodes 115 and 120 are each connected to a sound database 125 which stores recorded versions of different sounds regularly played to callers (e.g., ring tones, busy signals, etc.) for various phone systems around the world. In addition, telecommunications nodes 115 and 120 are each further connected to three additional databases: an authorized telephone database 130, an authorized codes database 135, and a nodes database 140, the purposes of which are described below.

As is further shown in FIG. 1, originating node 115 and terminating node 120 are connected by a data link such as data line 145. Alternatively, the data connection between originating node 115 and terminating node 120 may be achieved by any other suitable data or voice link employing wired or wireless technologies. As described below, the demands placed on the data line by the callback system of the present invention are small, permitting the data transmission needs of the present invention to be satisfied by a wide variety of communications options.

Operation of the seamless automated callback system of the present invention will now be described in connection with the flowchart shown in FIGS. 2A–D. As noted in the legend of FIGS. 2A–D, triangular tokens represent steps performed by the caller, rectangular tokens represent steps performed by originating node 115, and parallelogram shaped tokens represent steps performed by terminating node 120.

Turning to FIG. 2A, in step 202 the caller places a call from calling telephone 155 to originating node 115 via switch 20 105. In step 204, originating node 115 answers call 150 thus establishing a connection between originating node 115 and calling telephone 155.

The system then proceeds to steps 206–210 which illustrate two alternative means for establishing that the caller is authorized to employ the callback system. In the first embodiment, beginning with step 206, originating node 115 employs the caller-ID feature available in many locations to capture the telephone number of calling telephone 155. In step 210, this number is compared to the list of authorized telephone numbers stored in authorized telephone database 130, and if a match is established, the caller is permitted to use the callback network to place his call.

Returning to step 206, originating node 115 may alternatively prompt the caller to enter an authorization code using the keypad of calling telephone 155. In step 208, the caller enters the authorization code. In step 210, originating node 115 compares this authorization code to the list of authorized codes stored in authorized codes database 135, and if a match is established, the caller is permitted to use the callback network to place his call.

It should be recognized that although the embodiments of steps 206–210 have been described as alternatives, the system may serially employ both authorization techniques. Thus, originating node 115 might prompt the user to enter an authorization code only after a preliminary authorization has been established on the basis of the telephone number of calling telephone 155.

Once the caller's credentials have been established, the system proceeds to step 212 wherein originating node 115 prompts the caller to enter the number of called telephone 160. In step 214, the caller enters the number of called telephone 160.

Figure 2B:
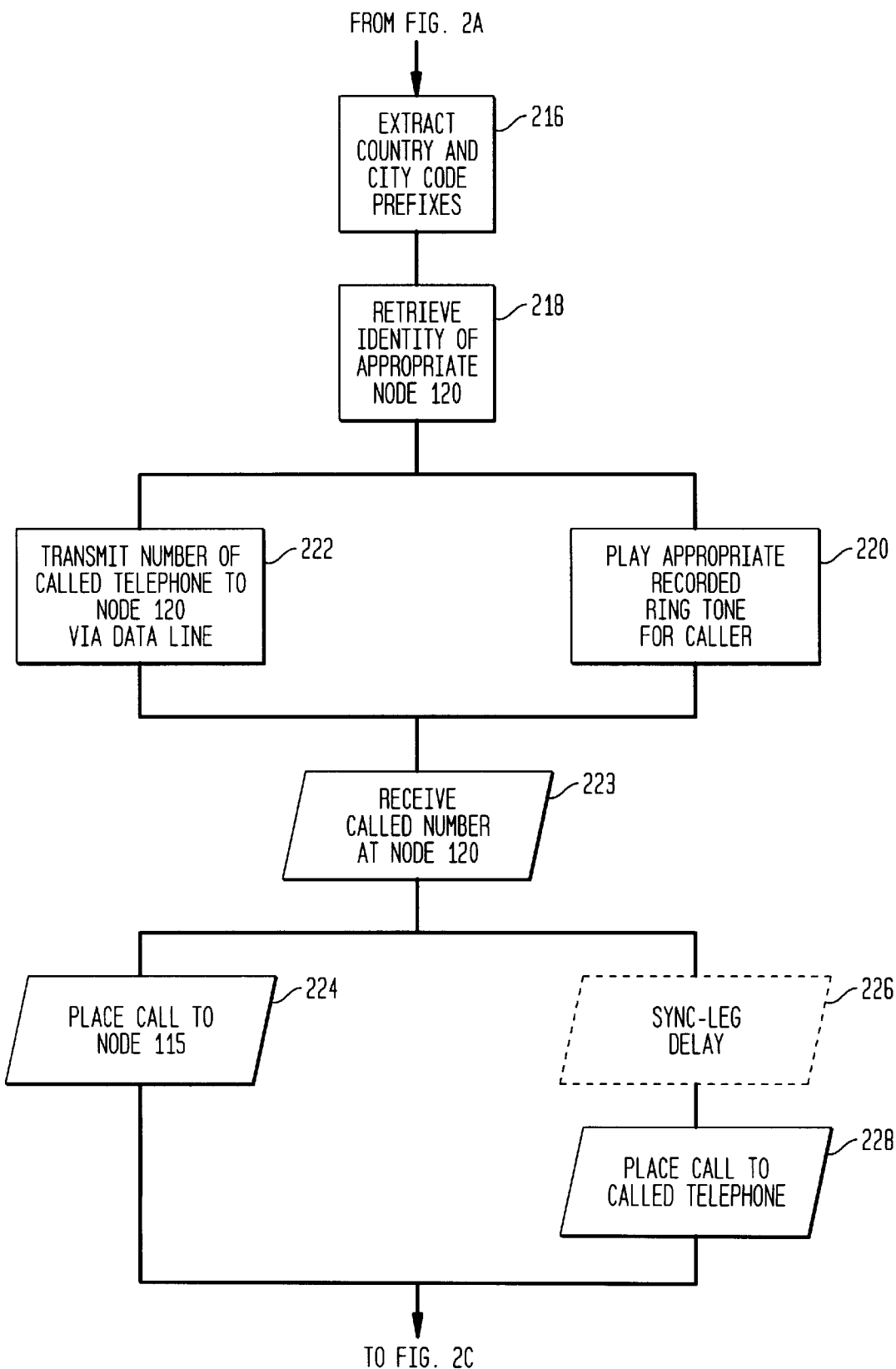

As shown in FIG. 2B, originating node 115 then enters a mode wherein it concurrently plays an appropriate ring tone for the caller and initiates the callback process. Preferably, this mode is not commenced until originating node 115 ascertains from the appropriate networks that connect time is available to connect the caller to the called party. In this way, the system creates for the caller the impression that his call has been connected directly to called telephone 160, although the connection with called telephone 160 has not yet been established.

Specifically, in step 216, originating node 115 extracts the country code and area code prefixes from the called number. In step 218, originating node 115 uses the extracted country and area codes to retrieve from node database 140 the identity of terminating node 120 predesignated as the optimal node to connect a call between originating node 115 and the called location. In this context, the optimal node for connecting a call between two points is the node for which the sum of the price of a call to the called telephone and the price of a call to originating node 115, is minimized. Knowing the identity of the terminating node, the originating node then checks to ascertain if connect time is available to connect the caller to the called party. If connect time is available, originating node 115 then uses the country code and area code prefixes in step 220 to retrieve from sound database 125 the appropriate recorded ring tone for the location being called and transmits the recorded ring tone to the caller without passing supervision to switch 105.

Concurrently therewith in step 222, originating node 115 transmits to terminating node 120 via data line 145 a data message comprising the identity of originating node 115 and the telephone number of called telephone 160. In addition, the message may contain service or other information that is part of the protocol between nodes. This data message is typically less than 128 bits.

Upon receipt of the data message from originating node 115 (step 223), terminating node 120 executes step 224 wherein it extracts from the message the identification code for originating node 115 and uses it to retrieve from node database 140 the telephone number of originating node 115. Terminating node 120 immediately places a call to originating node 115 via switch 110, network 165 and switch 105, or alternatively via another less expensive route which connects the two nodes. For the reasons described below, originating node 115 is programmed not to answer this call until instructed to do so by terminating node 120 via data line 145.

While the call to originating node 115 is being placed, terminating node 120 places a second call to called telephone 160 via switch 110 (step 228) and line 170. In one embodiment, the two calls from node 120 may be placed simultaneously. Preferably, however, because the time to establish a long distance connection with originating node 115 may be substantially greater than the time to establish a local connection with called telephone 160, terminating node 120 may delay placing the call to telephone 160 by a predetermined amount of time, as illustrated in step 226. In this preferred embodiment, the record for each node in node database 140 is provided with an additional "sync-leg" field which specifies the average additional time necessary to establish a telephonic connection with any destination.

Preferably, the "sync-leg" data is automatically updated at periodic intervals. Terminating node 120 retrieves the contents of the "sync-leg" field for originating node 115 from node database 140, and delays the call to telephone 160 by the retrieved delay amount. As will be recognized, this preferred embodiment advantageously avoids the need for a party answering called telephone 160 to wait for a long period while a connection with originating node 115 is established.

As shown in FIG. 2C, the call to telephone 160 will result in one of four outcomes. The first possibility is that it is answered by the called party. In that event, the system proceeds to step 232 wherein terminating node 120 transmits a data message to originating node 115 via data line 145 to answer the incoming call from network 165 and connect the call to the caller. Because originating node 115 may have several unanswered incoming calls pending simultaneously, terminating node 120 includes in its data message the originating telephone number of the incoming call from network 165. This uniquely identifies the call which originating node 115 should answer when combined with the DNIS (Dialled Number Identification Service) provided by the local telephone switch or by the SS7 network.

Upon receipt of this message from terminating node 120, originating node 115 identifies the incoming call from network 165 as the call to be answered (using caller identification equipment), answers the call, and connects line 150 and the appropriate line in network 165, thereby connecting the calling telephone 155 to switch 110, as indicated by steps 234 and 236. Concurrently therewith, in step 237, terminating node 120 connects line 170 and the opposite end of the same line in network 165 thus establishing a connection between calling telephone 155 and called telephone 160.

The second possibility is that the call results in a busy signal. In that case, the system proceeds to steps 238 and 240 wherein terminating node 120 signals originating node 115 via data line 145 that the called telephone 160 is busy and concurrently terminates the pending call on network 165 and the call to called telephone 160 on line 170. Upon receipt of the signal on data line 145 from terminating node 120, originating node 115 retrieves from sound database 125 the appropriate busy signal for the called location and plays that busy signal for the caller as depicted in step 242.

Figure 2D:
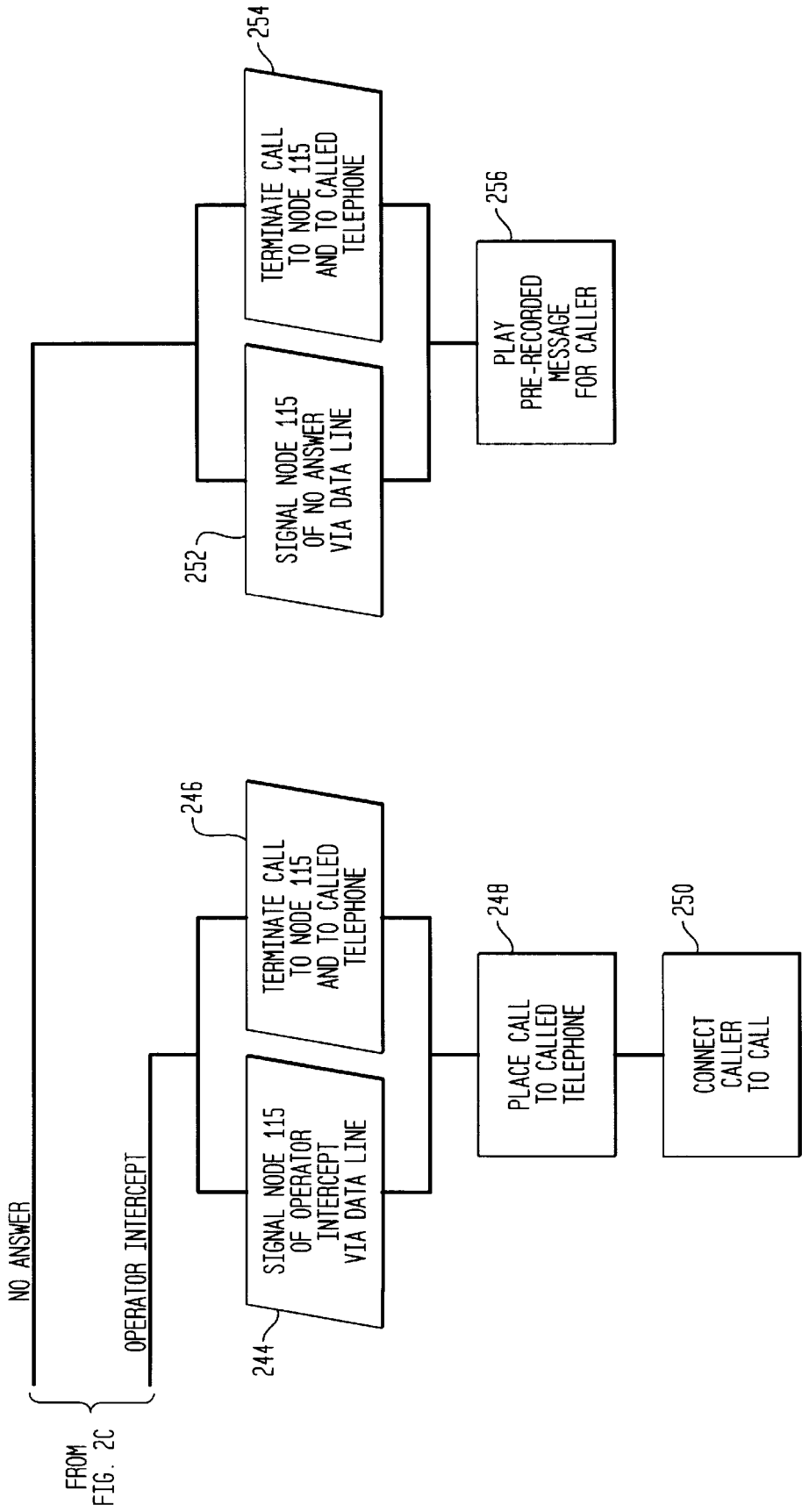

The third possibility is that the call results in an operator intercept. This will occur, for example, if called telephone 160 has been disconnected. In that case, as shown in FIG. 2D, the system proceeds to steps 244 and 246 wherein terminating node 120 signals originating node 115 via data line 145 that call 170 resulted in an operator intercept and concurrently terminates its pending call on network 165 and the call to called telephone 160 on line 170. In step 248, upon receipt of the signal on data line 145 from terminating node 120, originating node 115 places a call via switch 105 to called telephone 160 via network 165, and then, in step 250, immediately connects calling telephone 155 to that call via line 150 and switch 105. When the call goes through, the caller hears the operator intercept message without incurring long distance charges because operator intercepts do not result in a toll charge.

The fourth possibility is that the call results in no answer for some predetermined time (e.g., 40 seconds). In that event, the system proceeds to steps 252 and 254 wherein terminating node 120 signals originating node 115 via data line 145 that there is no answer at called telephone 160 and concurrently terminates its pending call on network 165 to originating node 115 and the call to called telephone 160 on line 170. Upon receipt of the signal from terminating node 120, originating node 115 replaces the ring tone played to the caller with a pre-recorded message informing the caller that there is no answer and asking the caller to try again at a later time as depicted in step 256.

In the above described embodiment, the connection between originating node 115 and terminating node 120 was established via a direct callback from terminating node 120 to originating node 115. However, a direct callback from the called location to the calling location may not constitute the least cost routing path for a call between the two locations. For example, when originating node 115 and terminating node 120 are both located in countries which do not permit competition among telephone carriers, the cost of a forward or reverse call between originating node 115 and terminating node 120 may be higher than the sum of the costs of two calls to originating node 115 and terminating node 120 from a transit node located in a country where such competition is permitted. In such circumstances, a less expensive way to connect originating node 115 to terminating node 120 is via the transit node located in the third country.

More generally, it will be recognized that a call from an originating node to a terminating node may be connected by any number of calling legs N, each of which may be completed in the forward or reverse direction. Thus, in general, the cost-efficient routing path for a call from an originating node to a terminating node is the path for which the sum:

$$\sum_{i=1}^{N} C_{i,i+1}$$

is minimized, where:
 node i=1 is the originating node;
 node i=N+1 is the terminating node;
 nodes i=2, 3, . . . , N, are transit nodes; and
 $C_{i,i+1}$=the lower of the cost of a call from node i to node i+1, or the cost of a call from node i+1 to node i.

Factors other than cost may also influence the choice of routing path. For example, a caller might demand a particular quality or priority level thereby eliminating certain telephone service providers from routing considerations. Similarly, the caller may have specific security or other needs which may limit the number of acceptable routing paths.

Credit imbalances between nodes may also affect the availability of particular routing paths. The cost of a telephone call is generally paid by the calling party and is collected by the authority which operates the local node providing service to the calling telephone, i.e., the originating node for the call. Some of this revenue, however, must be shared with other nodes in the routing path which participated in connecting the call. Thus, each time an originating node requests service from other nodes in the system, a debt is created between the originating node and those other nodes. This can create a substantial credit imbalance between a first node and a second node when calling traffic patterns require the first node to request service from the second node substantially more than they require the second node to request service from the first node. Agreements between node operators generally set limits on the credit imbalance permitted between them. When this credit imbalance is exceeded, calls originating from the node with the credit deficit cannot be routed via the node with the credit surplus.

Other factors may also affect the choice of routing path. For example, local regulations may prohibit certain transactions, such as terminating traffic originated via a private line or terminating traffic except through the gateway PTT (Post Telephone & Telegraph). In addition, many major carriers belong to carrier groups and are contractually obligated to run certain traffic over the networks of other group members. Also, some carriers may have specific origination points which provide the only points of entry into their networks. Similarly, some carriers may have specific termination options and rates for terminating traffic in local countries. Information such as this should be considered in making routing decisions.

In addition, it is important to consider the capacity and configuration of each node in making routing decisions. For example, during peak traffic periods, the capacity of a particular node may be exceeded, thus requiring an alternative routing for some calls. Alternatively, a particular node may be configured to provide only specific services such ATM, FAX, or internet services, and may not provide voice telephone services.

In addition, customers or carriers may request that all or some of their calls be routed via a specific routing path for a variety of reasons. For example, charitable organizations may choose to have all of their calls routed through developing countries in order to support the local economies in those countries. Alternatively, a customer or carrier might request routing of a minimum number of minutes each year through a particular node in order to maintain a strong business relationship with the node operator.

A customer might also request a particular routing path because of its tax implications. For example, a corporation with offices in several countries might request that a certain percentage of its calls originate from a particular country in order to offset profits earned in that country and thus decrease its tax liability.

Other factors which may influence the choice of routing path may include the size of the carriers in each routing path, the credit rating of the carriers in each routing path, or other factors. For example, it may be preferable to route a call via a node or carrier which is a low credit risk or from whom payment guarantees have been received, in order to maximize the likelihood of receiving payment from the node or carrier for services rendered to it.

As those skilled in the art will recognize, the above list of non-cost factors which may affect the choice of routing path is not comprehensive. Many additional factors may influence the choice of routing path. The present invention contemplates taking into consideration both cost and non-cost factors contemplated by customers, carriers, or node operators in determining the appropriate routing path for a given call.

In particular, in a second preferred embodiment, when a caller places a call from a calling telephone to a called telephone, the system determines a cost-efficient routing path for the call, also taking into account non-cost requirements imposed by the caller as well as other factors such as network availability and credit imbalances between particular pairs of nodes, and establishes a connection between the calling telephone and the called telephone via this cost-efficient routing path. This second preferred embodiment is described in connection with FIG. 3 and FIGS. 4A-F. The calling connections may be accomplished in the direct as well as callback directions based on cost and other considerations as described below.

Figure 3:
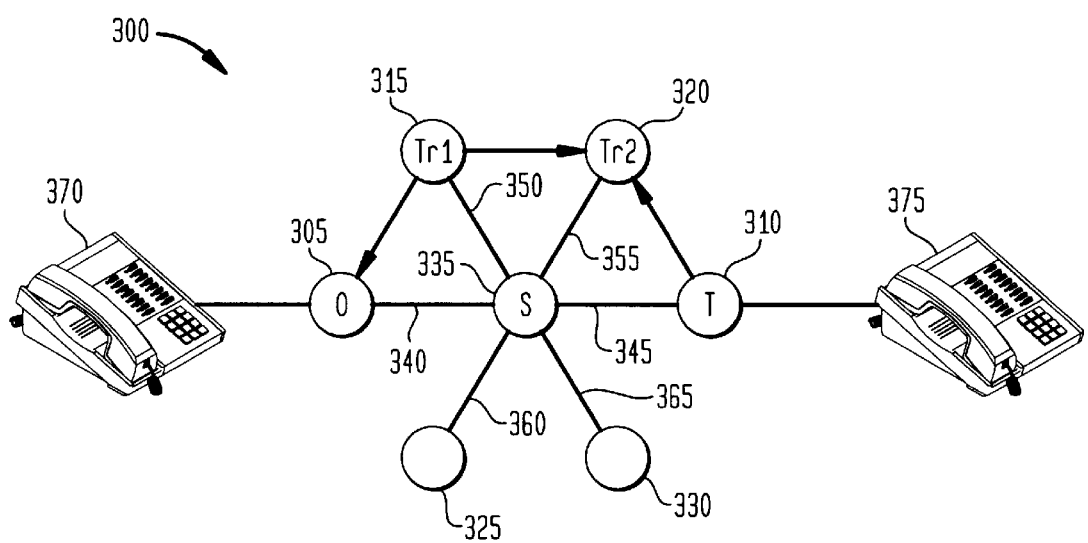
FIG. 3 is a block diagram of a global nodal network suitable for implementing a second preferred embodiment of the present invention.

FIG. 3 shows a global nodal network 300 suitable for implementing this second preferred embodiment of the present invention to connect a calling telephone 370 and a called telephone 375. Global network 300 comprises an originating node 305, and a terminating node 310, as well as additional nodes shown as nodes 315–330. Like nodes 115 and 120 described above, nodes 305–330 are preferably computer-based local telecommunication nodes capable of creating a connection between two remote parties each of whom is independently connected to the node via a telephone voice line. Also, although not shown in FIG. 3, each node 305–330 is preferably provided with a sound database 125, an authorized telephone database 130, an authorized codes database 135, and a nodes database 140 like those described above in connection with FIG. 1.

Global network 300 further comprises a server node 335 which is connected to each node in the global network via a data link, such as data lines 340–365, respectively. As noted above, these data connections may alternatively be achieved by any other suitable data or voice link employing wired or wireless technologies. As described in more detail below, server node 335 serves to clear transactions and authorize and coordinate all calls placed via global network 300.

Operation of this second preferred embodiment of the present invention is described in connection with the flowchart shown in FIGS. 4A–F. As noted in the legend of FIGS. 4A–F, rectangular tokens represent steps performed by originating terminal 305, parallelogram shaped tokens represent steps performed by terminating node 310, circular tokens represent steps performed by server node 335, diamond shaped tokens represent steps performed by calling nodes in the routing path, and hexagon shaped tokens represent steps performed by called nodes in the routing path.

The initial steps performed by the system to establish the caller's credentials and to determine the telephone number of called telephone 160, are the same in this embodiment as in the first preferred embodiment described above. Thus, returning briefly to FIG. 2A, in steps 202–204, the caller is connected to originating node 305; in steps 206–210, originating node 305 determines whether the caller is authorized to use the network; and in steps 212–214, originating node 305 receives and stores the number of called telephone 375.

Figure 4A:
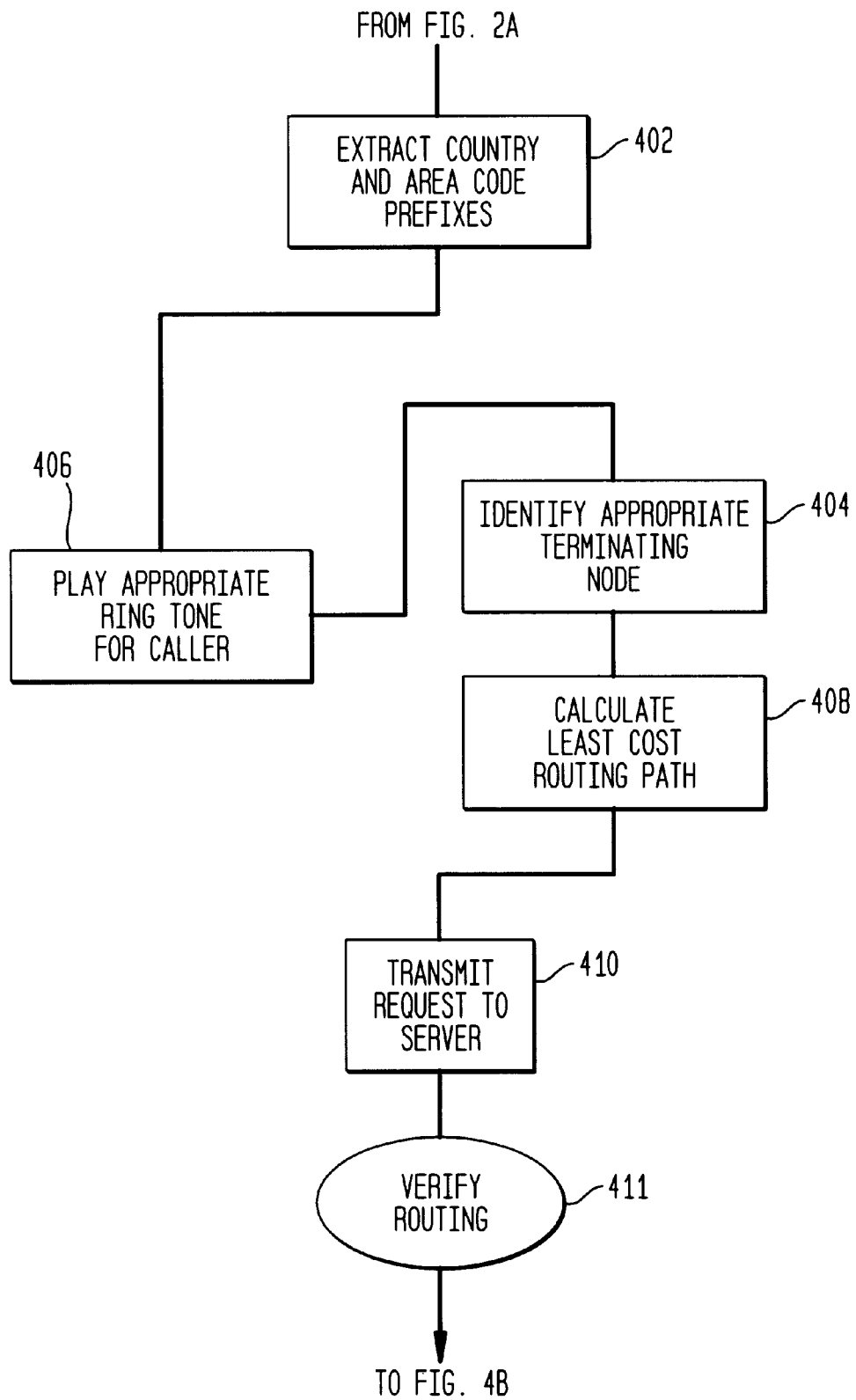

The system then proceeds to FIG. 4A wherein, in step 402 originating node 305 extracts the country code and area code prefixes from the called number.

In step 404, originating node 305 uses the extracted country code and area code to identify the terminating node closest to the called location. In step 408, originating node 305 calculates the cost-efficient routing path for a call to the called location, taking into account any non-cost requirements which may have been imposed by the caller, carrier, or operator, as well as other factors such as network availability and credit imbalances between particular pairs of nodes or operators. Alternatively, determination of the routing path may be performed by server node 335 in response to a service request from originating node 305. Preferably, this calculation is based on information transmitted to originating node 305 by server node 335 via data line 340. Server node 335 maintains an updated database which stores information received from each node 305–330 as well as other sources regarding cost and non-cost considerations which may influence the choice of routing path for a given call.

In addition to the rate and other information described above, the database preferably stores additional information regarding other topics, such as, local regulations which have been proposed but not yet enacted, local correspondent names and contacts, technical support information, financial contact information, target prices for originating carriers (i.e. data and traffic information from a carrier regarding what it is willing to guarantee at a particular rate).

As those skilled in the art will recognize, the total number of possible routing paths between any two nodes in the global network rises steeply as the number of nodes increases. Thus, unless the number of nodes is very small, the least cost routing path cannot practically be calculated by a brute force cost comparison of each potential path. In practice, however, a sufficiently optimal approximation of the least cost routing path may be determined using various heuristic techniques as known in the art, so as to determine a cost-efficient path.

If a routing path is available, originating node 305 then uses the country code and area code prefixes to retrieve from sound database 125 the appropriate recorded ring tone for the location being called and transmits the recorded tones to the caller. Thus, as in the first preferred embodiment described above, the system creates for the caller the impression that the call has been connected directly to called telephone 375, although the connection with called telephone 375 has not yet been established.

The arrows connecting nodes 305, 315, 320, and 310 in FIG. 3 schematically represent an illustrative cost-efficient routing path for a call from originating node 305 to terminating node 310. In the example shown in FIG. 3, this routing path consists of a first calling leg from a first transit node 315 to originating node 305; a second calling leg from first transit node 315 to a second transit node 320; and a third calling leg from terminating node 310 to second transit node 320. Once the cost-efficient routing path for the call has been computed, the system proceeds to step 410, wherein originating node 305 transmits a request to server node 335 via data line 340 asking server node 335 to establish a connection between originating node 305 and called telephone 15 375 via the least cost routing path determined by the originating node or by server node 335. At step 411, server node 335 verifies that the requested routing path is available to connect the call.

Turning to FIG. 4B, in step 412, server node 335 then transmits a data message via data lines 340–365 to every "calling" node in the cost-efficient routing path. A calling node is a node which is responsible for placing one of the calling legs in the routing path. Each data message transmitted by server node 335 comprises the identity of a "called" node, i.e., the node responsible for receiving the calling leg from the calling node. Each transit node in the cost-efficient routing path anchors two calling legs in the path. Thus, each transit node may serve as the calling node for two calling legs; as the called node for two calling legs; or as the calling node for one calling leg and the called node for a second calling leg. In the example shown in FIG. 3, transit node 315 serves as the calling node for the first and second calling legs of the routing path and transit node 320 serves as the called node for the second and third calling legs of the routing path.

The originating node must serve as either the calling node or the called node of the first calling leg in the routing path and the terminating node must serve as either the calling node or the called node in the final calling leg of the routing path. In the example shown in FIG. 3, originating node 305 serves as the called node for the first calling leg in the routing path and terminating node 310 serves as the calling node for the third, and last, calling leg in the routing path.

In step 420, each calling node places a call to its associated called node. The called nodes do not immediately answer these calls.

Concurrently with step 412, server node 335 transmits a data message via data line 345 to terminating node 310 as depicted in step 414. This data message comprises the number of called telephone 375. Upon receipt of this data message, telecommunication node 120 places a call to called telephone 160 as indicated by step 422.

In one embodiment, all of the calling legs and the call from terminating node 310 to called telephone 375 may be placed simultaneously. Preferably, however, because the time to establish a connection may differ substantially from one calling leg to the next, one or more of the calling legs may be delayed by a predetermined amount of time, as illustrated by step 416. In this embodiment, each node is provided with a "sync-leg" database which stores the average time necessary to establish a telephonic connection between any two nodes in global network 300. Server node 335 retrieves the connection times for each calling leg from its "sync-leg" database, and identifies the calling leg with the slowest connection time. Server node 335 then subtracts the connection time for each other calling leg from the slowest connection time in order to calculate an appropriate delay amount for each other calling leg. This delay amount is included as part of the data message transmitted to the calling nodes by server node 335.

Assume, for example, that for the routing path shown in FIG. 3, the connection time for the first calling leg from transit node 315 to originating node 305 is 45 seconds, the connection time for the second calling leg from transit node 315 to transit node 320 is 35 seconds, and the connection time for the third calling leg from terminating node 310 to transit node 320 is 20 seconds. In such a case, the data messages transmitted by server node 335 would instruct transit node 315 to place the first calling leg immediately; transit node 315 to place the second calling leg after a delay of 10 seconds; and terminating node 310 to place the third calling leg after a delay of 25 seconds. Similarly, as illustrated by step 418, server node 335 includes in its data message to terminating node 310 the connection time for the slowest leg of the routing path. In this preferred embodiment, terminating node 310 delays its call to called telephone 375 by the difference between that connection time and the time required to establish a connection with called telephone 375.

Synchronization of all legs in the routing path minimizes congestion on international phone lines and avoids the need for the called party to wait for a long period while a connection with originating node 305 is established.

In step 423, each calling node transmits to server node 335 the originating telephone number for the calling leg it has placed. Thus, in the example shown in FIG. 3, transit node 315 transmits to server node 335 the originating telephone number for its calling leg to originating node 305 and the originating telephone number for its calling leg to transit node 320. Similarly, terminating node 310 transmits the originating telephone number for its calling leg to transit node 320.

Figure 4C:
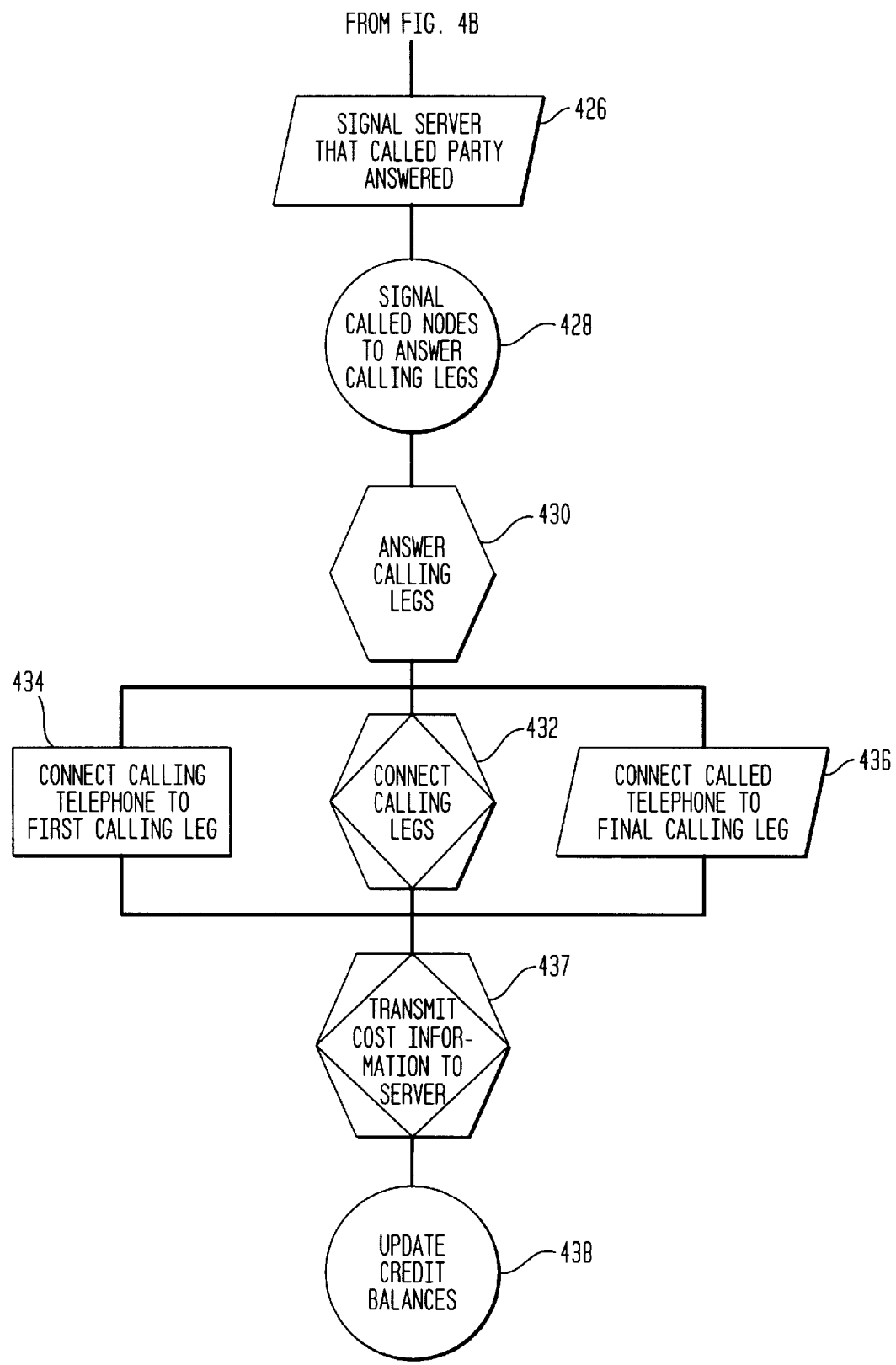

As in the first embodiment described above, the call from terminating node 310 to called telephone 375 will result in one of four outcomes. The first possibility is that it is answered by the called party. In that event, as shown in FIG. 4C, the system proceeds to step 426 wherein terminating node 310 signals server node 335 via data line 345 that the called party has answered called telephone 375.

Upon receipt of this message, in step 428, server node 335 transmits a data message to each called node via data lines 340–365 instructing the node to answer its incoming calling leg. Thus, in the example shown in FIG. 3, server node 335 transmits a single data message to node 305 via data line 340 and two data messages to node 320 via data line 355, instructing those nodes to answer the incoming calling legs of the routing path. Because each called node may have several unanswered calls pending simultaneously, server node 335 includes in its data message the originating telephone number of the calling leg which uniquely identifies the call to be answered by the called node when combined with the DNIS (Dialled Number Identification Service) provided by the local telephone switch or by the SS7 network.

In step 430, each called node answers its incoming calling leg. In step 432, each transit node in the routing path connects the two calling legs which it anchors. Thus, in the example shown in FIG. 3, transit node 315 connects the calling leg connecting it to originating node 305 to the calling leg connecting it to transit node 320. similarly, transit node 320 connects the calling leg connecting it to transit node 315 to the calling leg connecting it to terminating node 310.

In step 434, originating node 315 connects calling telephone 370 to the first calling leg in the routing path, and, in step 436, terminating node 310 connects called telephone 375 to the last calling leg in the routing path, thus establishing a connection between the caller and the called party.

At the termination of the call, in step 437, each node in the routing path provides cost information relating to the call to server node 335. On the basis of this information, server node 335 updates the credit balance records for all odes, as depicted in step 438. Periodically, server node 335 generates billing statements to the various nodes in global network 300, which reflect the credit deficit or surplus accrued by the node over the billing period.

Figure 4D:
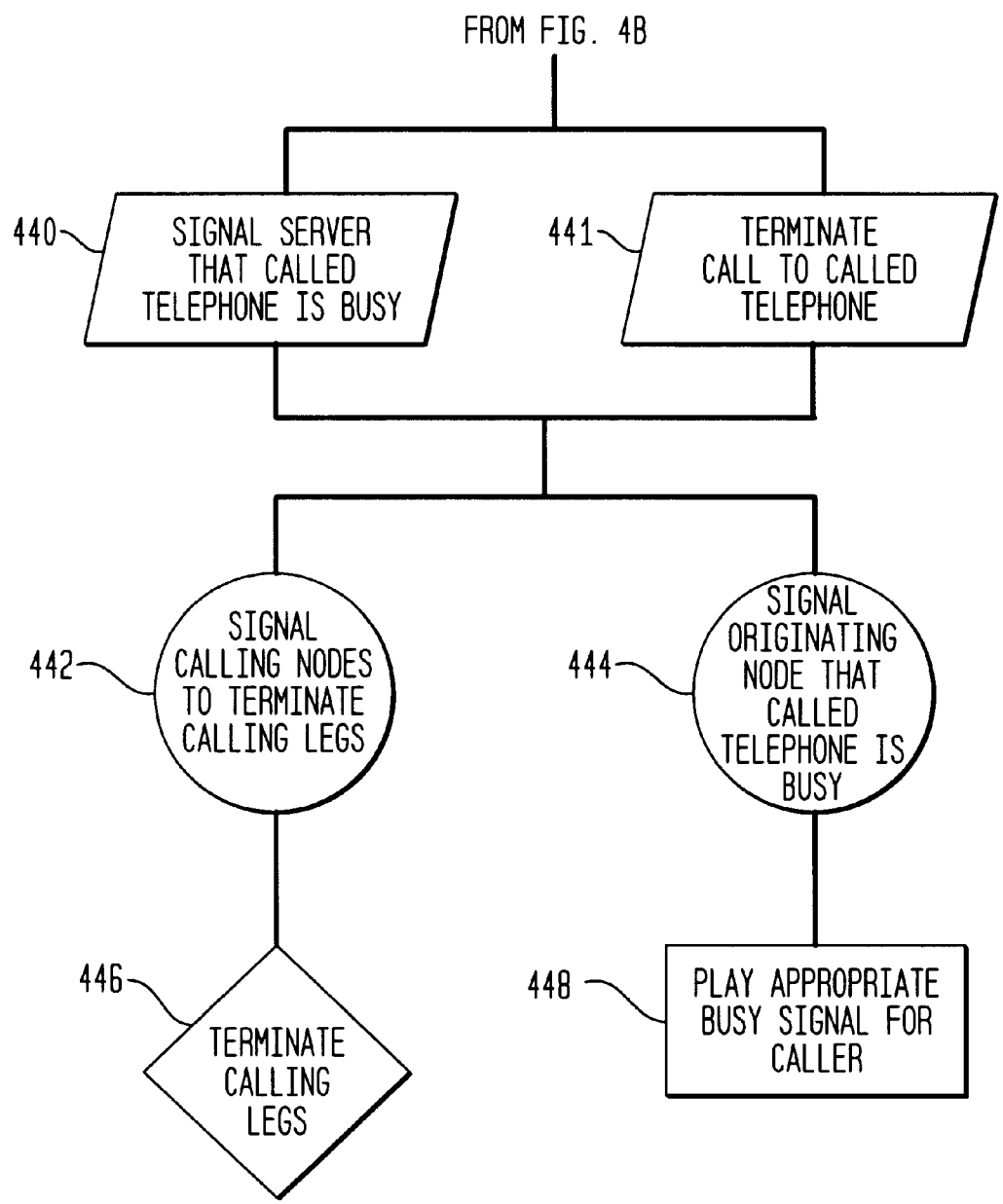

The call to called telephone 375 may also result in a busy signal. In that case, as shown in FIG. 4D, the system proceeds to step 440 where terminating node 310 signals server node 335 via data line 345 that the call to called telephone 375 resulted in a busy signal. Concurrently, in step 441, terminating node 310 terminates the call to called telephone 375.

Upon receipt of the message at server node 335, the server node transmits a data message to each calling node in the routing path via data lines 340–365 instructing each calling node to terminate its pending calling leg (step 442). Concurrently, in step 444, server node 335 signals originating node 305 via data line 340 that the call to called telephone 375 resulted in a busy signal. In step 446, each calling node terminates its pending calling leg. In step 448, originating node 305 retrieves from sound database 125 the appropriate busy signal for the called location and plays that busy signal for the caller.

Figure 4E:
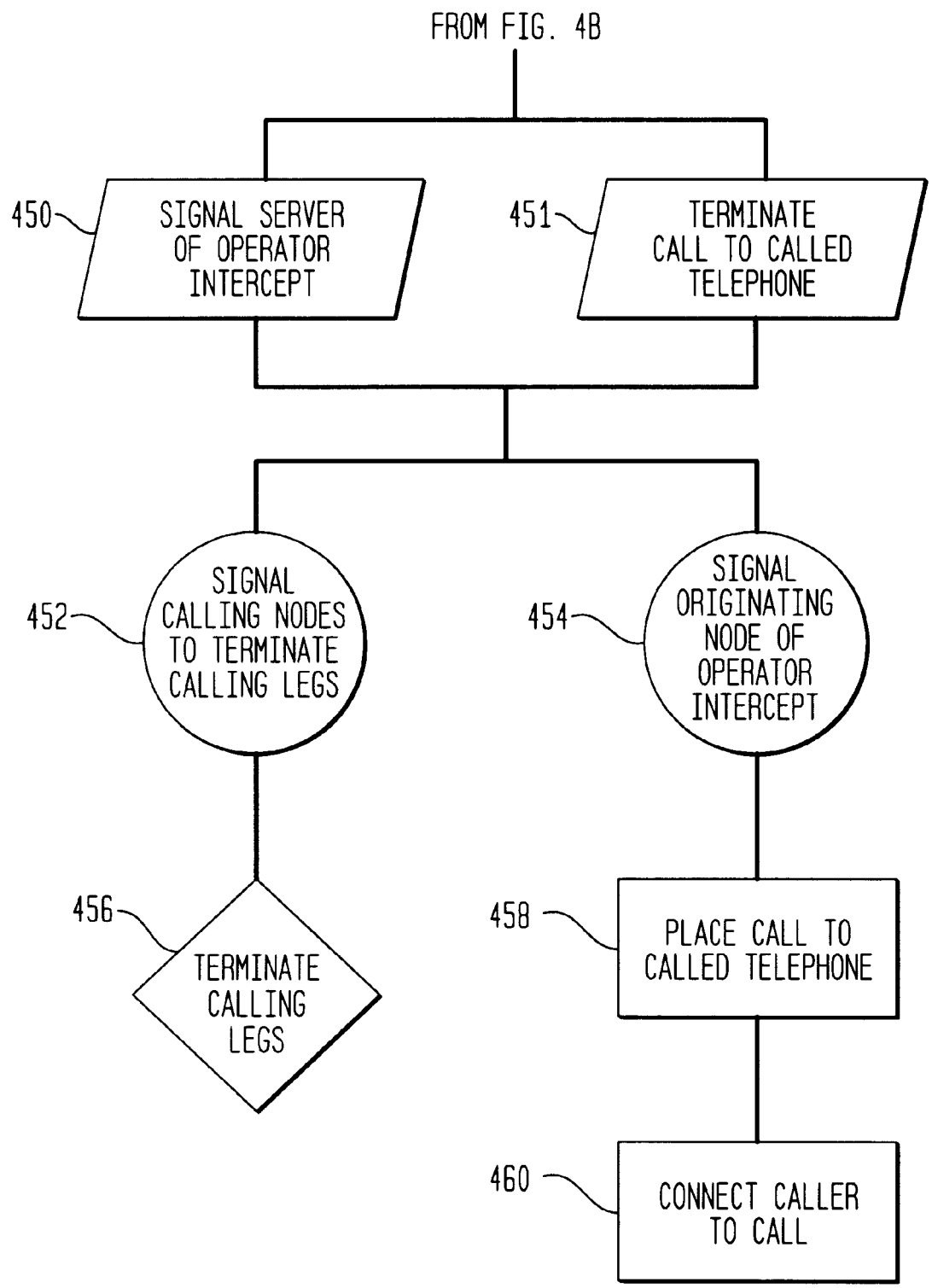

The call to called telephone 375 may also result in an operator intercept. In that case, as shown in FIG. 4E, the system proceeds to step 450 where terminating node 310 transmits a data message to server node 335 via data line 345 informing server node 335 that the call to called telephone 375 resulted in an operator intercept. Concurrently, in step 451, terminating node 310 terminates the call to called telephone 375.

Upon receipt of the message at server node 335, the server node transmits a data message to each calling node in the routing path via data lines 340–365 instructing each calling node to terminate its pending calling leg (step 452). Concurrently, in step 454, server node 335 signals originating node 305 via data line 340 that the call to called telephone 375 resulted in an operator intercept.

In step 456, each calling node terminates its pending calling leg. In step 458, originating node 305 places a call directly to called telephone 375, and then, in step 460, immediately connects calling telephone 370 to that call. When the call goes through, the caller hears the operator intercept message without incurring long distance charges because operator intercepts do not result in a toll charge.

Figure 4F:
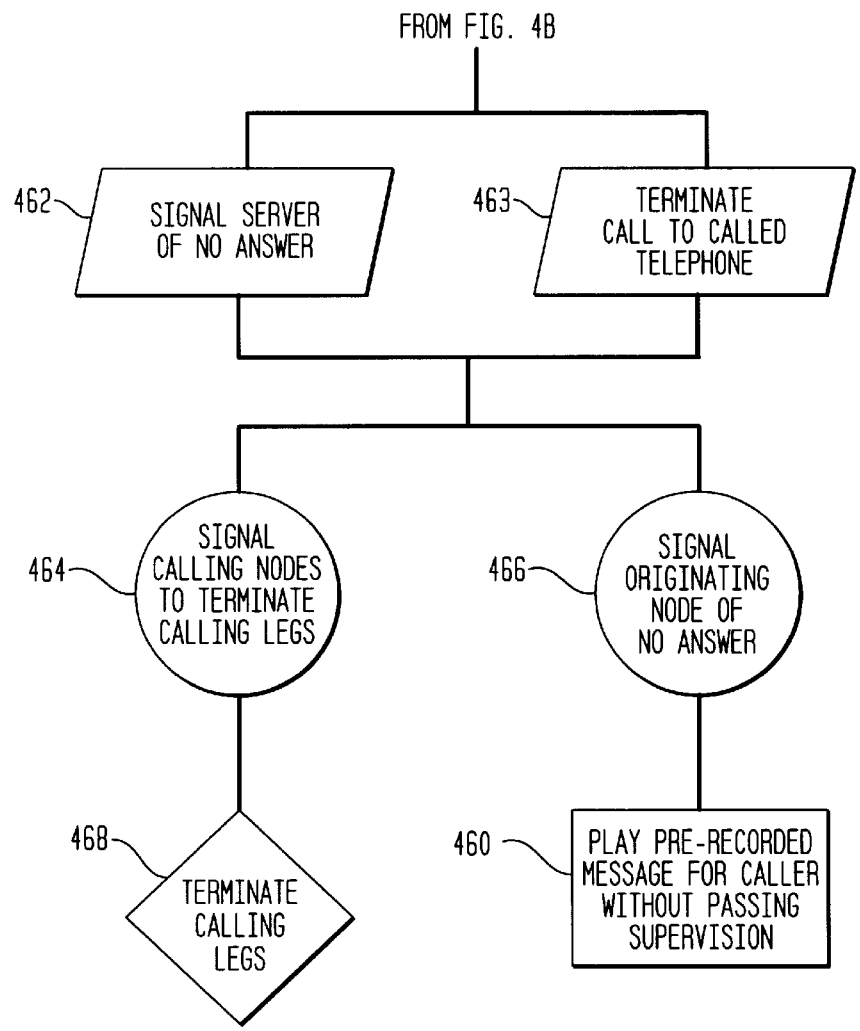

The call to called telephone 375 may also result in no answer for some predetermined time (e.g., 40 seconds). In that event, as shown in FIG. 4F, the system proceeds to step 462 where terminating node 310 transmits a data message to server node 335 via data line 345 informing server node 335 that the call to called telephone 375 resulted in no answer. Concurrently, in step 463, terminating node 310 terminates the call to called telephone 375.

Upon receipt of the message at server node 335, the server node transmits a data message to each calling node in the routing path via data lines 340–365 instructing each calling node to terminate its pending calling leg (step 464). Concurrently, in step 446, server node 335 signals originating node 305 via data line 340 that the call to called telephone 375 resulted in no answer.

In step 468, each calling node terminates its pending calling leg. In step 470, originating node 305 replaces the ring tone played to the caller with a pre-recorded message informing the caller that there is no answer and asking the caller to try again at a later time.

In the above described embodiment, nodes 305–330 do not directly transmit data messages to each other. Instead, all data messages are transmitted to server node 335 which then relays an appropriate data message to the nodes of global network 300. It should be noted, however, that the system could be configured so that some or all of the data messages transmitted in steps 423, 426, 440, 450, and 462 would also be transmitted directly between telecommunication nodes 305–330, in addition to being transmitted to server node 335. Direct data communication between nodes may increase the speed of the system by eliminating the delay inherent in routing these data messages via server node 335.

In addition, it should be recognized that while server node 335 has been illustrated as a physically distinct node separate from telecommunication nodes 305–330, the coordinating and record keeping functions of the server node could be performed by any telecommunication node in the global network. In addition, the functions performed by server node 335 could be distributed among more than one node 305–330.

It should further be recognized that although one purpose of connecting telephone calls via intermediate telecommunications nodes is to minimize cost, other purposes for employing such intermediate nodes may exist. For example, the calling party may desire to conceal his identity (i.e., telephone number) from the called party. Connecting the calling party to the called party via at least one intermediate node permits the caller to remain anonymous even if the called telephone is provided with caller identification equipment, since the call to the called telephone is placed from an intermediate node, rather than from the calling telephone.

Figure 5:
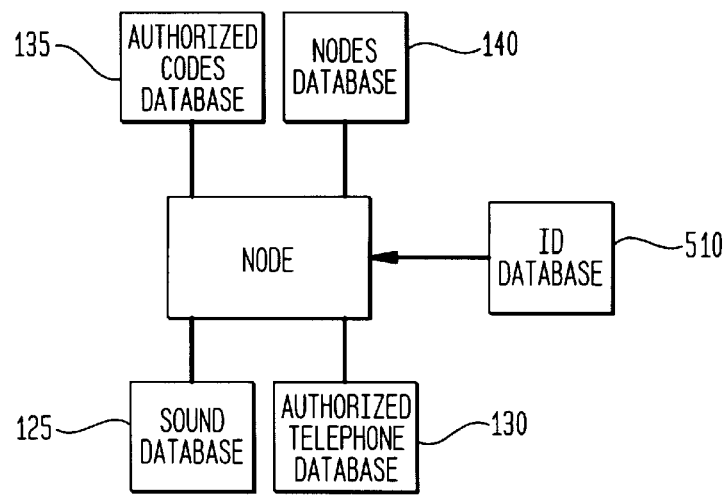
FIG. 5 is a block diagram of a telecommunication node configured to permit a called party to conceal his identity from a calling party.

In addition, the system can be configured to provide the called party with a similar degree of privacy by concealing the telephone number of the called telephone from the calling party. When this degree of privacy is desired, each telecommunication node is additionally provided with an ID database 510, as shown in FIG. 5. ID database 510 stores the telephone numbers of called parties in its operating region as well as a unique identifier for each called party which the called party can distribute to calling parties. When the terminating node receives instructions to place a call to a particular unique identifier, it retrieves the telephone number of the called telephone from ID database 510 and places the call to that number. This enables the called party to receive phone calls from the caller without revealing to the caller the telephone number of the called telephone.

Called-party-specific identifiers may also be used to permit the system to reach the called party at more than one location. Thus, for example, ID database 510 may store a primary telephone number for the called party (e.g., the number of called telephone 160 or 375) and a secondary telephone number to be used when the called party fails to answer a call at the primary number. Alternatively, the system may simultaneously dial two (or more) telephone numbers which have been stored for a called party in order to locate and connect the called party to the calling party as quickly as possible.

At times, it may be preferable to predesignate one or more transit nodes to handle all calling traffic between an originating node and a terminating node, rather than to calculate a routing path each time a call is placed. In a third preferred embodiment of the present invention, the system employs one predesignated transit node to connect calls from an originating node to a terminating node. This third preferred embodiment is described in connection with FIGS. 6 and 7A–F.

Figure 6:
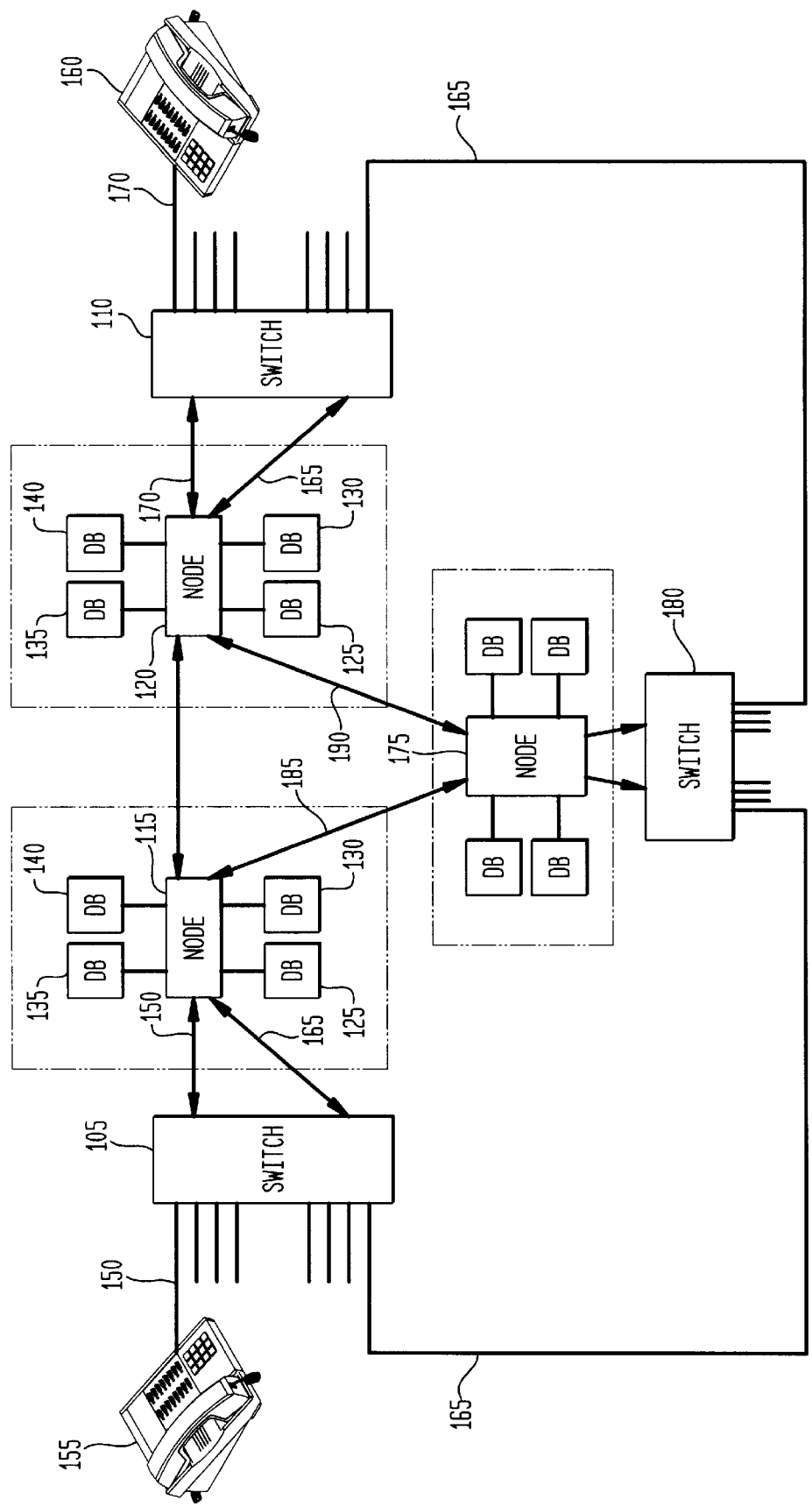
FIG. 6 is a block diagram of a telephone system architecture suitable for implementing a third preferred embodiment of the present invention.
Figure 7B:
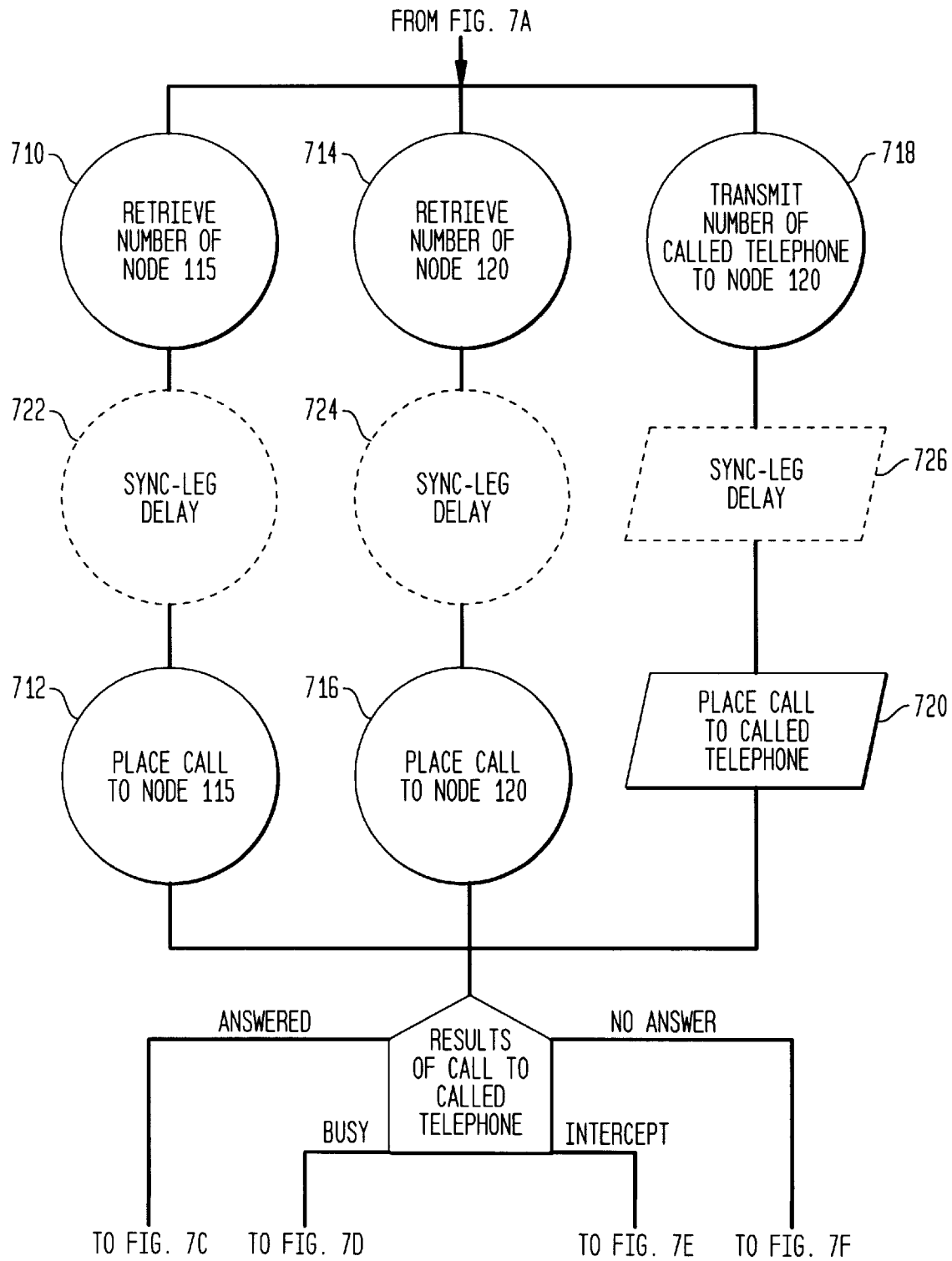

FIG. 6 shows a telephone system architecture suitable for implementing this third preferred embodiment of the present invention. As will be recognized, the elements of FIG. 6 are substantially similar to those in FIG. 1, and like elements in the two drawings are indicated by like numerals. In addition to the hardware shown in FIG. 1, however, FIG. 6 additionally comprises a switch 180 remote from both switch 105 and switch 110. Switch 180 is connected to both switch 105 and switch 110 by conventional wired or wireless networks, such as the public switched telephone network, schematically represented by line 165.

Also shown in FIG. 6 is a transit node 175 adapted to place and receive calls through switch 180. In a preferred embodiment, transit node 175 may be identical to nodes 115 and 120 and, like nodes 115 and 120, may be provided with a sound database 125, an authorized telephone database 130, an authorized codes database 135, and a nodes database 140. Transit node 175 is connected to nodes 115 and 120 by data links such as data lines 185 and 190, respectively.

Operation of this alternative preferred embodiment will now be described in connection with FIGS. 7A–F. In addition to the tokens employed in FIGS. 2A–D, FIGS. 7A–F additionally employ circular tokens which represent steps performed by transit node 175.

The initial steps performed by the system to establish the caller's credentials and to determine the telephone number of called telephone 160, are the same in this alternative preferred embodiment as in the first preferred embodiment described above in connection with FIG. 2A. Thus, in steps 202–204, the caller is connected to originating node 115; in steps 206–210, originating node 115 determines whether the caller is authorized to use the network; and in steps 212–214, originating node 115 receives and stores the number of called telephone 160.

The system then proceeds to FIG. 7A where, in step 702, originating node 115 extracts the country code and area code prefixes from the called number.

In step 704, originating node 115 uses the extracted country code and area code to retrieve from node database 140 the identity of transit node 175 predesignated as the node responsible for connecting calls between originating node 115 and terminating node 120. Knowing the identity of the transit node, the originating node then checks to ascertain if connect time is available to connect the caller to the transit mode. If connect time is available, originating node 115 then transmits to transit node 175 via data line 185 a data message comprising the identity of originating node 115 and the telephone number of called telephone 160 (step 708).

Concurrently, if connect time is available originating node 115 uses the country code and area code prefixes in step 706 to retrieve from sound database 125 the appropriate recorded ring tone for the location being called and transmits the recorded ring tone to the caller without passing supervision to switch 105. Thus, as in the first preferred embodiment described above, the system creates for the caller the impression that his call has been connected directly to called telephone 160, although the connection with called telephone 160 has not yet been established.

Upon receipt of the data message from originating node 115, transit node 175 executes step 710 wherein it extracts from the message the identification code for originating node 115 and uses it to retrieve from node database 140 the telephone number of originating node 115. In step 712, transit node 175 places a call to originating node 115 via switch 18, network 165 and switch 105. As in the first embodiment described above, originating node 115 is programmed not to answer this call until instructed to do so by telecommunication node 175 via data line 185.

Concurrently, in step 714, transit node 175 extracts the country and area prefixes from the called number and uses these prefixes to retrieve from node database 140 the telephone number of terminating node 120 located in the called location. In step 716, transit node 175 places a call to terminating node 120 via switch 180, network 165 and switch 110. Terminating node 120 is programmed not to immediately answer the call from transit node 175.

Concurrently, as depicted in step 718, transit node 175 transmits to terminating node 120 via data line 190 a data message comprising the originating telephone number of the call from transit node 175 to terminating node 120 and the telephone number of called telephone 160. Upon receipt of the data message from transit node 175, terminating node 120 executes step 720 wherein it places a call to called telephone 160 via switch 110 and line 170.

In one embodiment, the two calls from transit node 175 and the call from terminating node 120 to called telephone 160 may all be placed simultaneously. Preferably, however, because the time to establish a connection between nodes 175 and 115 may differ substantially from the time to establish a connection between nodes 175 and 120, transit node 175 may delay placing one of the two calls by a predetermined amount of time, as represented by steps 722 and 724. In this preferred embodiment, the record for each node in node database 140 is provided with an additional "sync-leg" field which specifies the average time necessary to establish a telephonic connection with the node. Transit node 175 retrieves the contents of the "sync-leg" field for telecommunication nodes 115 and 120 from node database 140, subtracts one delay from the other, and delays the more quickly connected call by the absolute value of the resulting difference. In this way the two connections are established at approximately the same time, thus avoiding the need for either the caller or the called party to wait for a long period while a connection with the other party is established.

Similarly, as represented by step 726, transit node 175 includes in its data message to terminating node 120 the connection time for the slower of the two calls placed by transit node 175. Terminating node 120 delays its call to called telephone 160 by the difference between that connection time and the time required to establish a connection with called telephone 160.

Again, the call to called telephone 160 will result in one of four outcomes. The first possibility is that it is answered by the called party. In that event, as shown in FIG. 7C, the system proceeds to step 730 where terminating node 120 transmits a data message to transit node 175 via data line 190 that the called party has answered called telephone 160. In step 732, transit node 175 in turn transmits a data message to originating node 115 via data line 185 to answer the incoming call from network 165 and connect the call to the caller. As in the first embodiment described above, because originating node 115 may have several unanswered incoming calls pending simultaneously, terminating node 120 includes in its data message the originating telephone number of the incoming call from network 165. This uniquely identifies the call which originating node 115 should answer when combined with the DNIS (Dialled Number Identification Service) provided by the local telephone switch or by the SS7 network. Also in step 732, transit node 175 transmits a similar data message to terminating node 120 via data line 190 to answer the incoming call from network 165 and connect the call to the called telephone 160. Upon receipt of the message from transit node 175, originating node 115 identifies the incoming call from network 165 as the call to be answered (using caller identification equipment), answers the call, and connects line 150 and the appropriate line in network 165, thereby connecting the calling telephone 155 to transit node 175, as depicted in steps 734 and 736.

Concurrently, in steps 738 and 740, terminating node 120 identifies the incoming call from network 165 as the call to be answered (using caller identification equipment), answers the call, and connects line 170 to that call. Also concurrently therewith, in step 742, transit node 175 connects the call to originating node 115 to the call to terminating node 120 thus establishing a connection between calling telephone 155 and called telephone 160.

The second possibility is that the call from terminating node 120 to called telephone 160 results in a busy signal.

In that case, as shown in FIG. 7D, the system proceeds to steps 744 and 746 wherein terminating node 120 signals transit node 175 via data line 190 that called telephone 160 is busy and concurrently terminates its call to called telephone 160. In step 748, transit node 175 in turn signals originating node 115 via data line 185 that called telephone 160 is busy, and, in step 750, terminates its pending calls to both originating node 115 and terminating node 120.

Upon receipt of the signal on data line 185 from transit node 175, originating node 115 retrieves from sound database 125 the appropriate busy signal for the called location and plays that busy signal for the caller as depicted in step 752.

The third possibility is that the call from terminating node 120 to called telephone 160 results in an operator intercept. This will occur, for example, if called telephone 160 has been disconnected. In that case, as shown in FIG. 7E, the system proceeds to steps 754 and 756 wherein terminating node 120 signals transit node 175 via data line 190 that the call to called telephone 160 resulted in an operator intercept and concurrently terminates its call to called telephone 160. In step 758, transit node 175 in turn signals originating node 115 via data line 185 that the call to called telephone 160 resulted in an operator intercept, and, in step 760, terminates its pending calls to both originating node 115 and terminating node 120.

In step 762, upon receipt of the signal on data line 185 from transit node 175, originating node 115 places a call via switch 105 to called telephone 160 via network 165, and then, in step 764, immediately connects calling telephone 155 to that call via line 150 and switch 105. When the call goes through, the caller hears the operator intercept message without incurring long distance charges because operator intercepts do not result in a toll charge.

The fourth possibility is that the call results in no answer for some predetermined time (e.g., 40 seconds). In that event, as shown in FIG. 7F, the system proceeds to steps 766 and 768 wherein terminating node 120 signals transit node 175 via data line 190 that there is no answer at called telephone 160 and concurrently terminates its call to called telephone 160. In step 770, transit node 175 in turn signals originating node 115 via data line 185 that the call to called telephone 160 resulted in no answer, and, in step 772, terminates its pending calls to both originating node 115 and terminating node 120.

Upon receipt of the signal from transit node 175, originating node 115 replaces the ring tone played to the caller with a pre-recorded message informing the caller that there is no answer and asking the caller to try again at a later time as depicted in step 774.

In this third preferred embodiment, the role played by transit node 175 is two-fold. First, it serves to connect originating node 115 to terminating node 120. Second, it performs much of the coordinating function performed by server node 335 in the second preferred embodiment described above.

In the above described embodiment, nodes 115 and 120 do not transmit data messages directly to each other. It should be noted, however, that the system could be configured so that some or all of the data messages transmitted in steps 708, 730, 744, 754, and 766 would additionally be transmitted directly between terminating node 120 and originating node 115 via data line 145. In appropriate circumstances, this may increase the speed of the system by eliminating the delay inherent in routing these data messages via transit node 175.

On-line service providers may also benefit from aspects of the present invention. Typically, an on line service provider will provide each customer with a software program to be run on the customer's computer. When a customer wishes to log on to the on-line service, he launches the provider's software program. The software directs the customer's computer to dial into a gateway of the on-line service provider.

At present, customers are directed to dial either a local telephone number or a toll-free telephone number in order to reach the provider's gateway. Some providers provide the customer with several telephone numbers, each of which represents a local call from a particular location. When the customer launches the provider's software program, the program prompts the user to enter the local access telephone number for the customer's location. The entered number is then dialed by the customer's computer. Alternatively, the appropriate local access number for the customer's location may be stored in memory and retrieved when the customer wishes to log in to the service. The customer, for example, may need to specify only the area code of his location.

Access to a local gateway permits a customer to use the on-line service without incurring long distance charges. Instead, the customer incurs only the local access cost. It imposes, however, substantial costs on the service provider since it requires the provider to establish local gateways in many locations. In addition, local access is inconvenient for customers who travel, since the customer must use a different local telephone number to access the on-line service each time he reaches a new location. Also, local access may, at times, not be available, such as when all lines into the local gateway are busy. In such an instance, the customer may be unable to access the on-line service even though more remote gateways have lines free to service the customer.

To avoid these problems, some operators offer a premium rate toll-free service which allows customers to dial in from anywhere in the United States at a tariff which covers the cost of the toll-free service. The cost of the toll-free call, however, may be significant, and may substantially increase the cost to the customer of accessing the on-line service.

In a fourth preferred embodiment, the invention employs a call-back system to minimize the cost of connecting a customer to an on-line service without requiring the service provider to establish local gateways for all of its customers. This fourth preferred embodiment is described in connection with FIG. 8 and FIGS. 9A–C.

Figure 8:
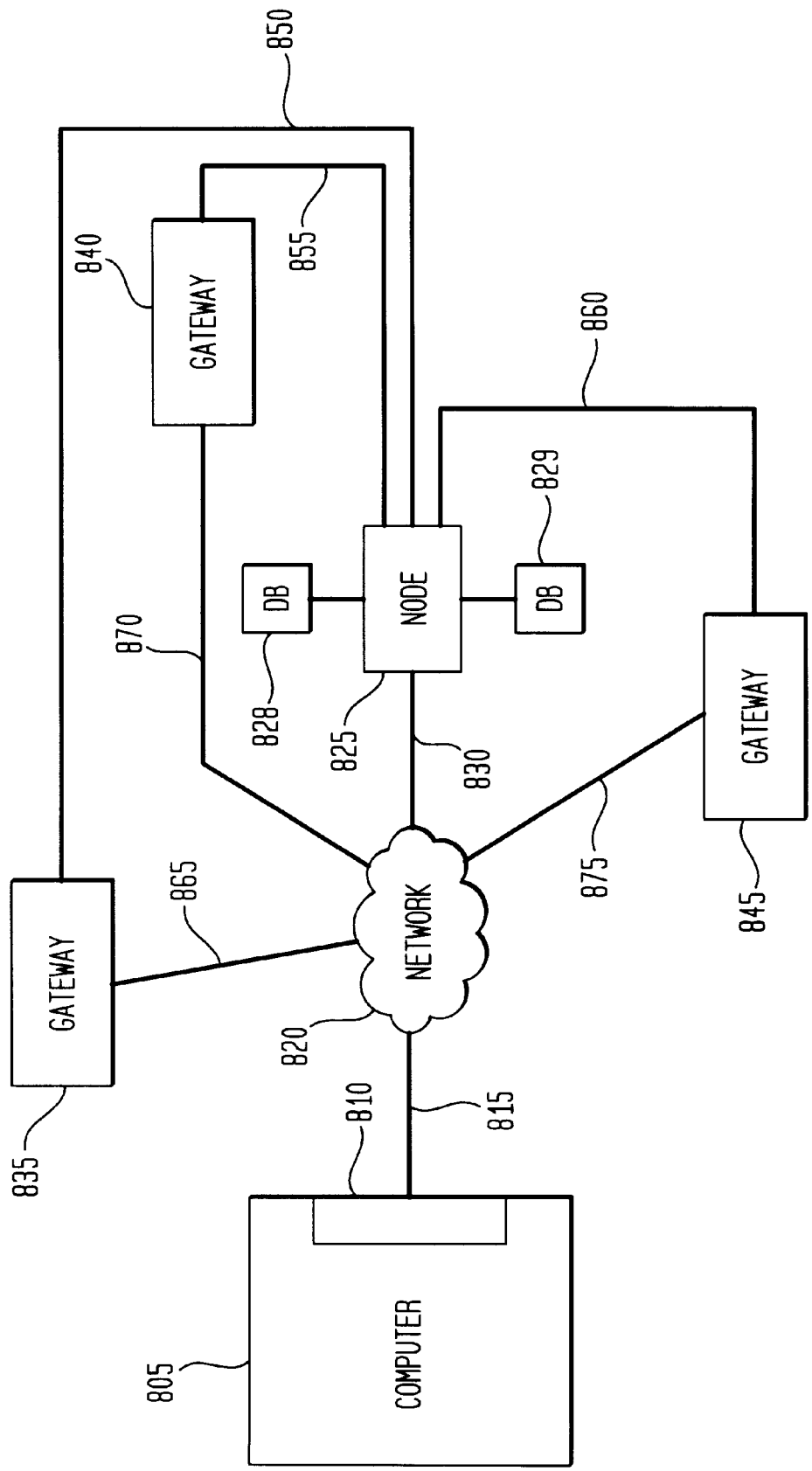
FIG. 8 is a block diagram of a system architecture suitable for implementing a fourth preferred embodiment of the present invention.

Turning first to FIG. 8, there is shown a system architecture suitable for implementing this fourth preferred embodiment of the present invention. As shown in FIG. 8, the architecture comprises a computer 805. Generally, computer 805 will belong to a customer of the on line service provider. A software program for accessing an on-line service is resident in computer 805. Computer 805 has a modem 810 which connects computer 805 to a conventional telephone network 820 such as the public switched telephone network via a line 815.

Also shown in FIG. 8 is a telecommunication node 825 which is connected to telephone network 820 via a line 830. Telecommunication node 825 is preferably a computer-based local telecommunication node capable of receiving and placing phone calls and modem access over telephone network 820. Telecommunication node 825 is also connected to one or more gateways, illustratively shown as gateways 835–845, via a plurality of data links such as data lines 850–860, respectively. Gateways 835–845 are connected to telephone network 820 via lines 865–875, respectively.

As noted above, data lines 850–860 may alternatively be achieved by another suitable data or voice link employing wired or wireless technologies.

As is further shown in FIG. 8, telecommunication node 825 is provided with a gateway database 828 which stores the identity and location of each gateway 835–845, and with an authorized user database 829 which stores the account numbers, passwords, and telephone numbers of individuals authorized to access the on-line service.

Operation of this fourth preferred embodiment will now be described in connection with FIGS. 9A–D. In FIG. 9, triangular tokens represent steps taken by the customer or by computer 805, rectangular tokens represent steps taken by telecommunication node 825, and parallelogram shaped tokens represent steps taken by one or more of gateways 835–845.

Figure 9A:
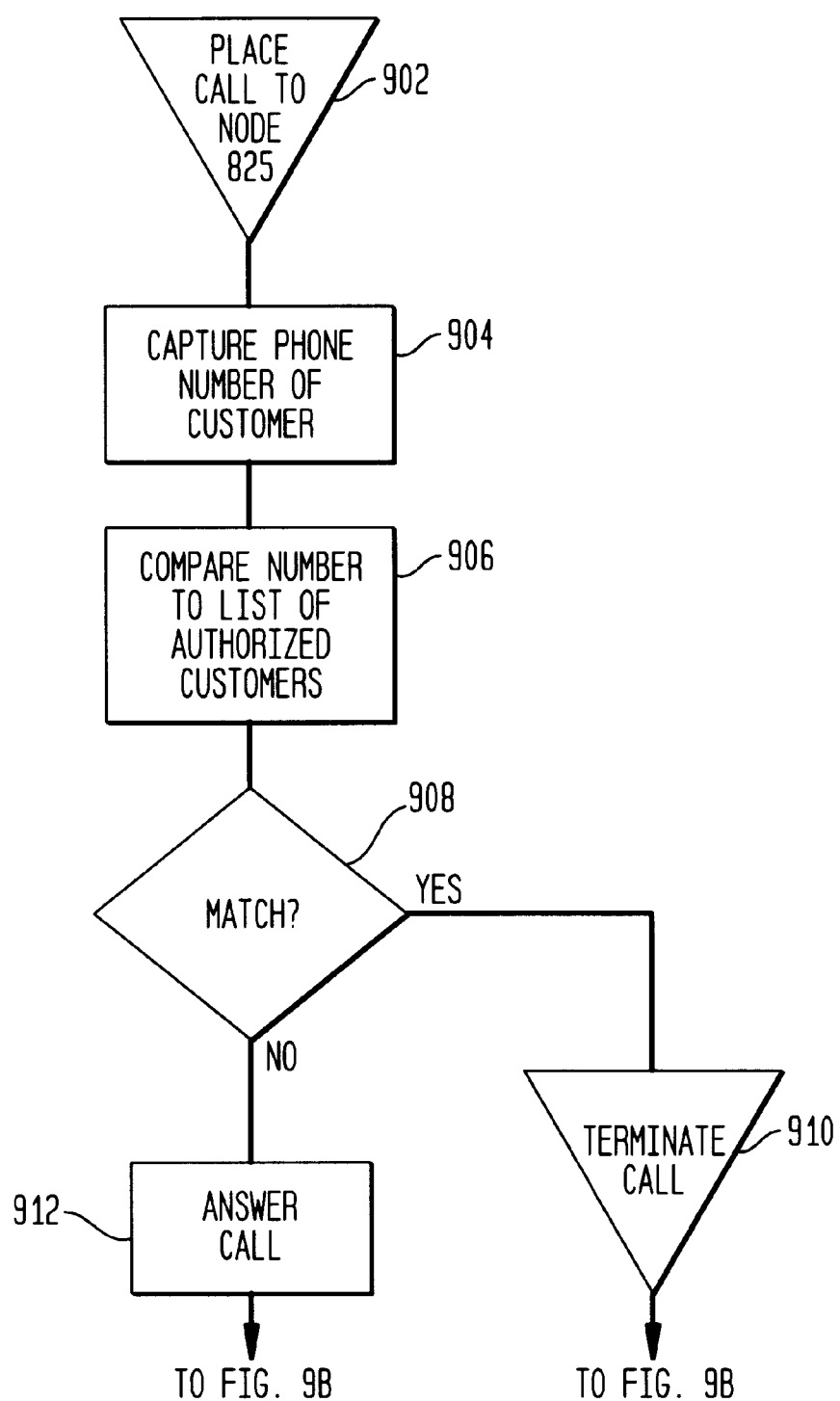
FIGS. 9A–D are a flowchart depicting operation of the fourth preferred embodiment of the present invention.

Turning to FIG. 9A, in step 902, the customer places a call to telecommunication node 825 via line 815, network 820, and line 830. This call may be placed in several ways. For example, the caller may dial the number of telecommunication node 825 from a standard telephone. Alternatively, the customer may launch a computer program which causes computer 805 to dial the number of telecommunication node 825 via modem 810. It is expected that the service provider will provide a toll-free line for this call. Telecommunication node 825 does not immediately answer the call from the customer. Instead, in step 904, telecommunication node 825 captures the telephone number of the customer using caller identification equipment. In step 906, this number is compared to a list of the telephone numbers of authorized customers stored in authorized user database 829.

The system then proceeds to decision step 908. If a match is detected between the originating telephone number of the customer call and the telephone number of an authorized customer, then decision step 908 succeeds and the system proceeds to step 910 where the customer call is terminated, either by the customer or by computer 805. From step 910, the system proceeds to step 936, the purpose of which will be described below. Thus, the system identifies the customer requesting service without incurring any telephone charges.

Figure 9B:
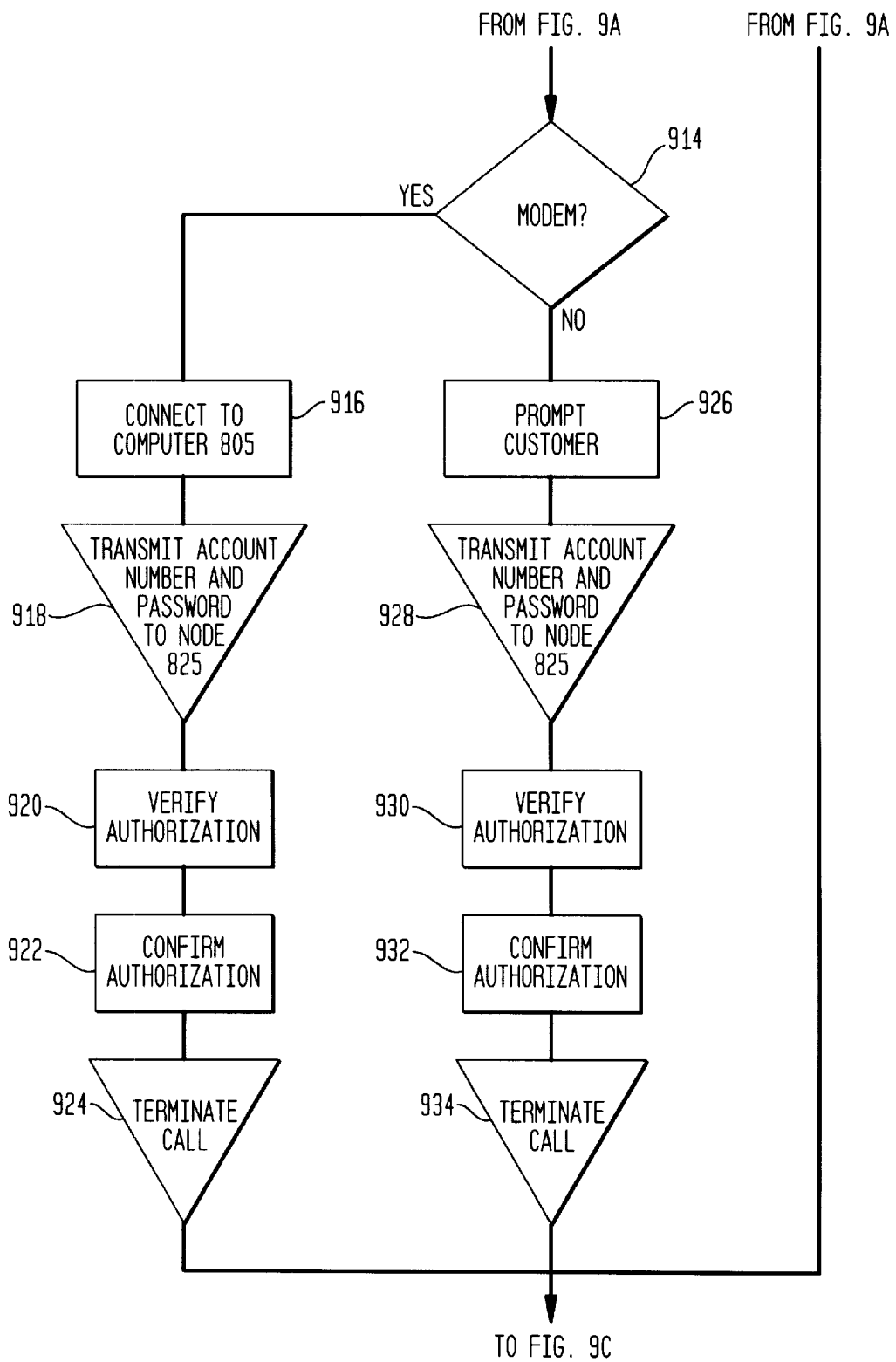

If, however, a match is not found, then decision step 908 fails, and the system proceeds to step 912 where telecommunication node 825 answers the call from the customer. Turning to FIG. 9B, in decision step 914, telecommunication node 825 determines whether the customer has dialed in manually, or whether the customer has dialed in using computer 805 and modem 810. Specifically, if telecommunication node 825 detects a modem tone on line 830, decision step 914 succeeds and telecommunication node 825 establishes a connection with computer 805 via modem 810, as depicted in step 916. In step 918, computer 805 transmits to telecommunication node 825 the account number and password of the customer. This message may also comprise additional information necessary to call back the customer. For example, when the customer calls in from a hotel room, this message may comprise the phone extension of the customer's room. The room extension may be required to place a call directly to the customer without going through the hotel's operator.

In step 920, telecommunication node 825 looks up the customer's account number and password in authorized user database 829 and verifies that the customer is entitled to access the on-line service. Telecommunication node 825 then transmits a signal to computer 805 via telephone network 820 confirming verification of the customer's identifying data, as depicted in step 922. Upon receipt of this confirmation signal, in step 924, computer 805 terminates the call to telecommunication node 825. The system then proceeds to step 936.

If, on the other hand, telecommunication node 825 does not detect a modem tone on line 830 in decision step 914, it transmits an audio prompt to the customer requesting that the customer enter his account number and password, as depicted in step 926. In step 928, the customer transmits his account number and password to telecommunication node 825. In step 930, telecommunication node 825 looks up the customer's account number and password in authorized user database 829 and verifies that the customer is entitled to access the on-line service. Telecommunication node 825 then transmits a signal to computer 805 via telephone network 820 confirming verification of the customer's identifying data, as depicted in step 932. Upon receipt of this confirmation signal, in step 934, computer 805 terminates the call to telecommunication node 825. The system then proceeds to step 936.

Thus, the duration of the toll-free call from computer 805 to telecommunication node 825 is brief even when telecommunication node 825 answers the call from the customer. Consequently, the cost of the call is low. Moreover, because each call from a customer is very short, telecommunication node 825 can handle a large volume of calls without requiring a large number of incoming lines.

Figure 9C:
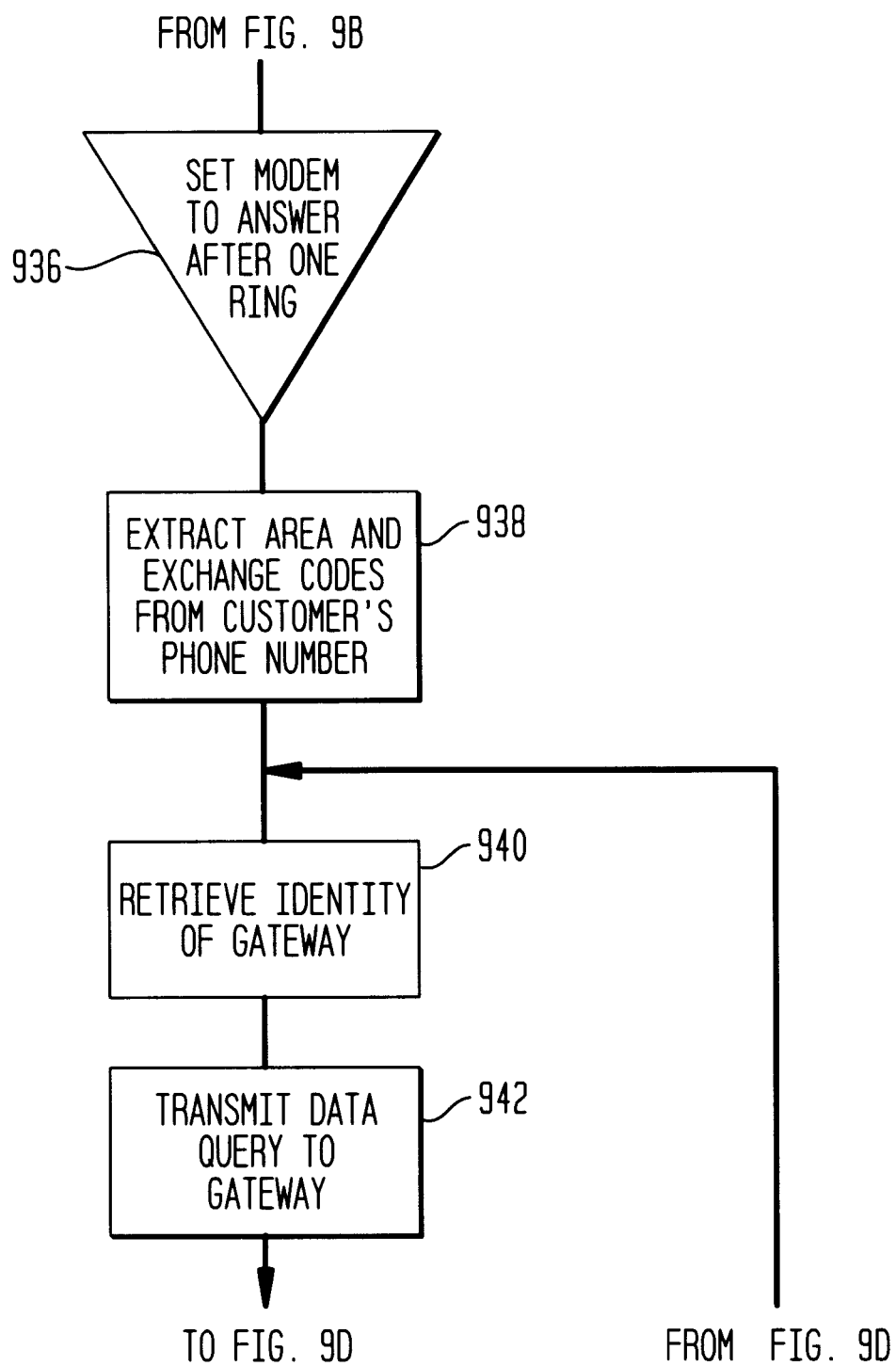

Turning to FIG. 9C, in step 936, computer 805 sets modem 810 to answer an incoming call on the first ring. This ensures that the call-back from the on-line service provider will be answered by computer 805 and not by any other device connected to the customer's telephone line such as a fax machine or answering machine. It also minimizes the period of time which the customer must wait before gaining access to the on-line service.

In step 938, telecommunication node 825 extracts the area code and exchange code from the telephone number of computer 805 that was captured at step 904 and from these codes determines the location of computer 805. In step 940, telecommunication node 825 then retrieves from gateway database 828 the identity of the most cost-efficient gateway to service computer 805, illustratively shown in FIG. 8 as gateway 835.

Determination of the cost-efficient gateway to service the customer may include consideration of many factors. For example, the cost of a telephone call from a gateway to the customer's location may be considered. In addition, other factors such as a gateway's capacity, the type of service desired by the customer, the estimated duration of service, the type of connection desired, other aspects of the customer's profile, as well as many other factors may influence the determination of the cost-efficient gateway to service the customer.

Figure 9D:
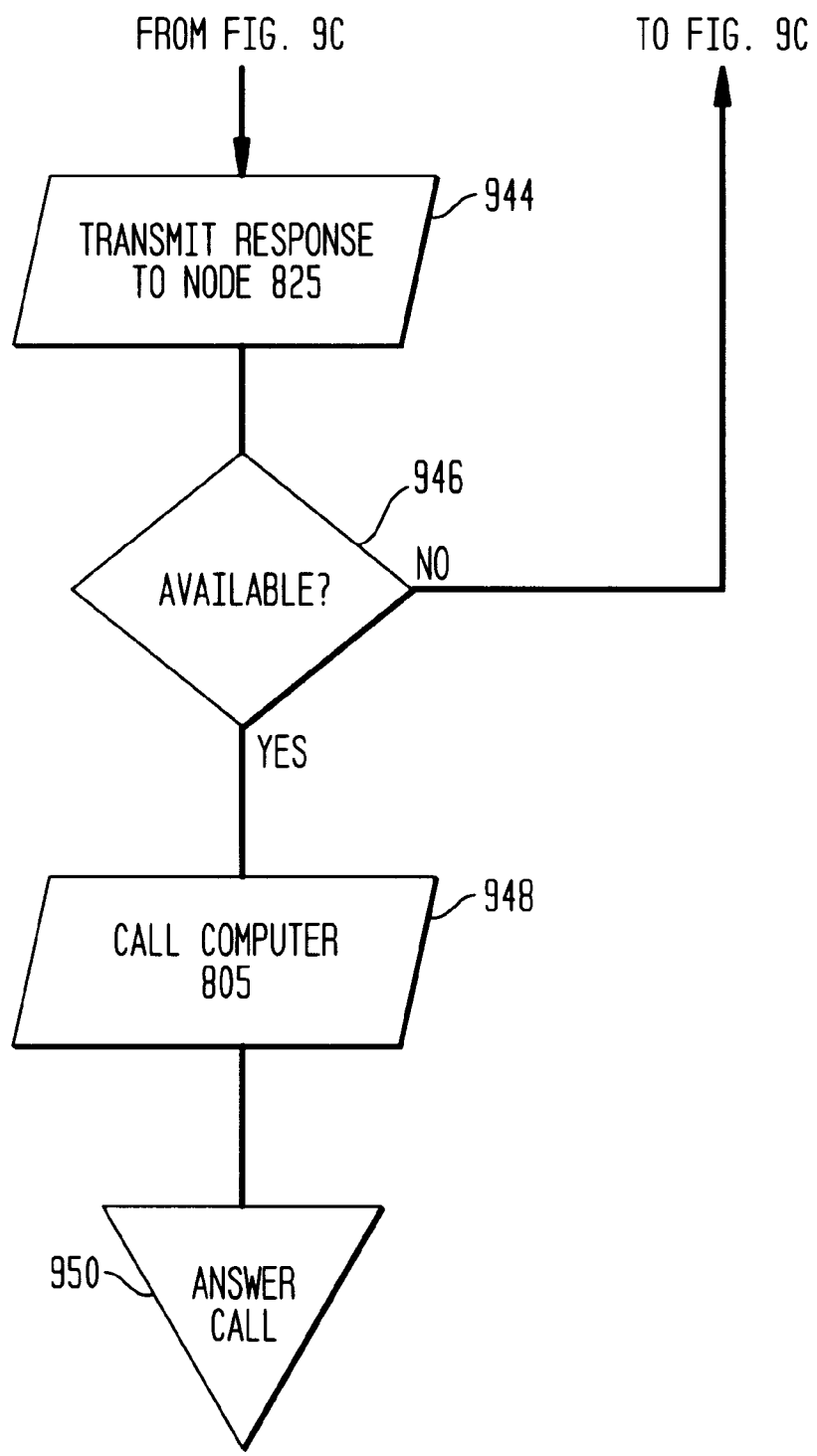

In step 942, telecommunication node 825 transmits a data query to gateway 835 via data line 865 asking whether gateway 835 is available to service computer 805. The query includes the telephone number of computer 805 as well as the account number and password of the customer. Turning to FIG. 9D, in step 944, gateway 835 transmits a response to the data query back to telecommunication node 825 via data line 865.

The system then proceeds to decision step 946 wherein the response from gateway 835 is evaluated. In particular, if gateway 835 is available to service computer 805, then decision step 946 succeeds and the system proceeds to step 948 wherein gateway 835 places a call to computer 805 via telephone network 820. At step 950, computer 805 answers the call from gateway 835 and is provided access to the services provided by the service provider.

If, on the other hand, gateway 835 is not available to service computer 805, decision step 946 fails and the system returns to steps 940–946 wherein telecommunication node 825 retrieves from gateway database 828 the identity of the next most cost-efficient gateway to service computer 805 and transmits a data query to this next most cost-efficient gateway requesting service for computer 805. These steps are repeated until telecommunication node 825 either identifies a gateway which can service computer 805 or queries all of the gateways in the system and fails to identify one which is available to service computer 805. In the former event, the customer is provided access to the on-line service via the identified gateway in a manner analogous to that described above in connection with steps 948 and 950. In the latter event, telecommunication node 825 places a call to computer 805 via telephone network 820. When computer 805 answers the call, telecommunication node 825 informs computer 805 that access to the on-line service is not available at the present time.

Alternatively, steps 924 and 934 may be performed after step 946 rather than after steps 922 and 932 as shown in FIG. 9. In this alternative embodiment, node 825 identifies a gateway to service the customer while maintaining its telephonic connection with the customer. Once a gateway for the customer has been reserved, or alternatively once node 825 ascertains that no gateway is available to service the customer, node 825 transmits a message to the customer to this effect, and then terminates the call to the customer.

This alternative does not add significantly to telephone connection time costs because, generally speaking, the time required for node 825 to poll the gateways will be only several seconds.

Preferably, in this alternative, node 825 is provided with gateway capabilities and begins to provide the customer with access to the on-line service immediately upon answering the customer's call. When a gateway is identified by node 825, service to the customer is temporarily suspended while the connection between node 825 and the customer is terminated and a new connection between the gateway and the customer is established.

The fourth preferred embodiment described above has the potential to greatly decrease the cost of connecting a customer to an on-line service. This is because the customer is connected to the service via a callback from a gateway to the customer, rather than via a toll-free or local call from the customer to a gateway via a predetermined line. In general, the on-line service provider should be able to negotiate contracts for large blocks of connection time with various local telephone operators at rates well below the rates charged for toll-free or local calls. Consequently, this embodiment of the present invention should yield significant savings in connection costs to the on-line service provider, who can then pass some or all of those savings on to the customer. In addition, this preferred embodiment has the potential to decrease the number of times that customers will receive busy signals and are unable to dial into the on-line service since this preferred embodiment better distributes utilization of gateway resources.

Figure 10:
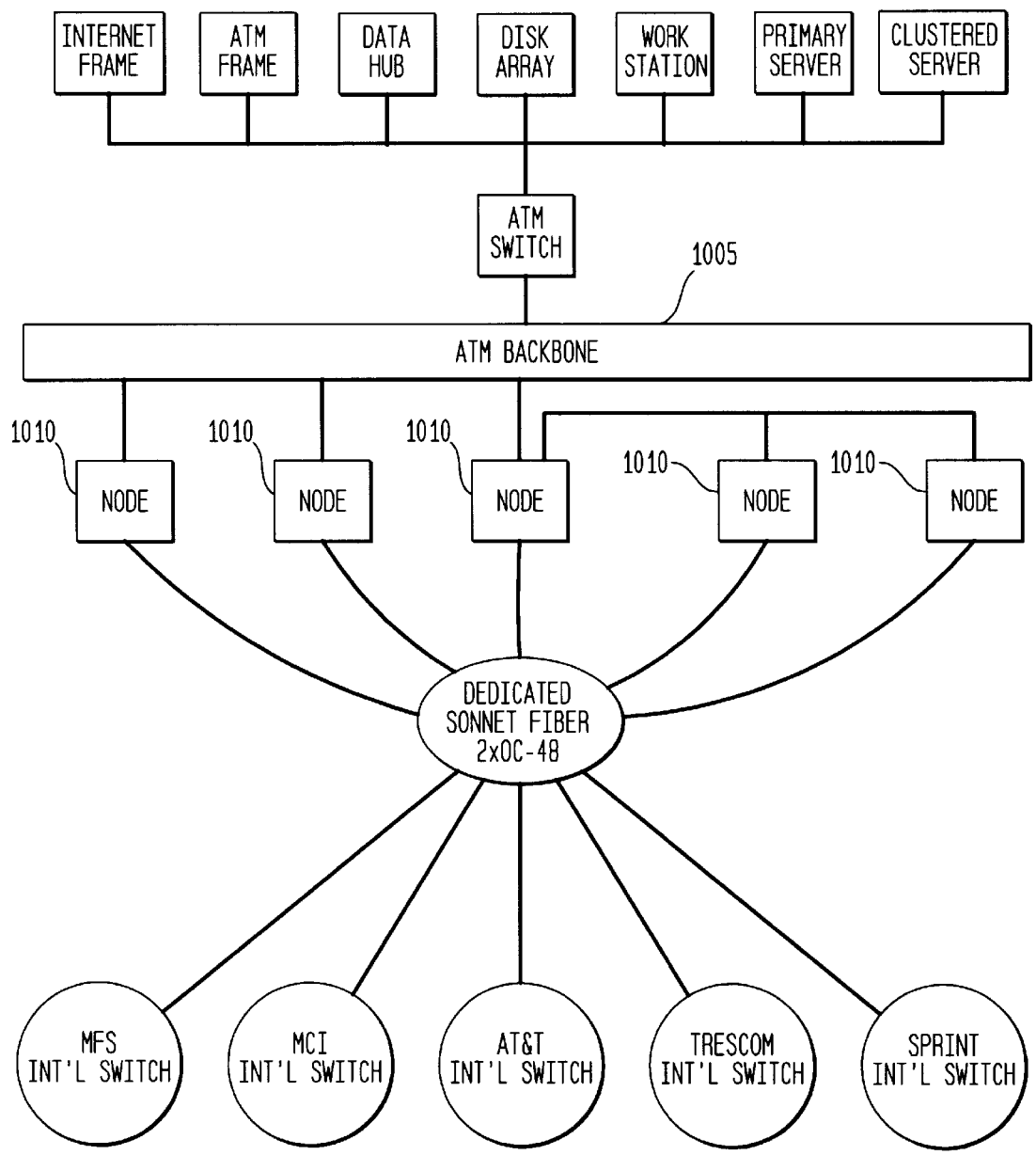
FIG. 10 is a block diagram of a global nodal network in which some of the telecommunication nodes are linked via an ATM backbone.

While the invention has been described in conjunction with specific embodiments, it is evident that numerous alternatives, modifications, and variations will be apparent to those skilled in the art in light of the foregoing description. For example, in all of the preferred embodiments described above, the data links between nodes were illustratively shown as distinct from the lines carrying the transmission from the calling party to the called party. Alternatively, however, some or all of the nodes in the system could be linked via an ATM backbone or other transmission means suitable for carrying both data and voice transmissions from node to node. A system architecture employing an ATM backbone 1005 to link a plurality of nodes 1010 which form part of a global network is shown in FIG. 10. Nodes 1010 may be located in different countries. In addition, ATM backbone 1005 may cross national boundaries.

I claim:

1. A method of connecting a calling telephone user equipment and a called telephone user equipment comprising:

establishing a first connection between the calling telephone and a first telecommunications node via a first telephone switch;

transmitting a data message from the first telecommunications node to a second telecommunications node remote from the first telecommunications node via a data line, the data message comprising the telephone number of the called telephone user equipment;

placing a call from the second telecommunications node to the first telecommunications node via a second telephone switch and the first telephone switch;

placing a call from the second telecommunications node to the called telephone user equipment;

receiving at the second telecommunications node an indication of the result of the call placed to the called telephone user equipment;

transmitting a data message from the second telecommunications node to the first telecommunications node via a data line, the content of the data message being reflective of the indication;

answering the call from the second telecommunication node to the first telecommunication node when the data message indicates that the call from the second telecommunications node to the called telephone user equipment has been answered.

2. The method of claim 1 further comprising the step of connecting the calling telephone user equipment to the called telephone user equipment when the data message indicates that the call from the second telecommunications node to the called telephone user equipment has been answered.

3. The method of claim 1 further comprising the step of transmitting a recorded busy signal tone generated by the first telecommunications node to the calling telephone user equipment when the data message indicates that the called telephone user equipment is busy.

4. The method of claim 1 further comprising:

placing a second call from the first telecommunications node to the called telephone user equipment when the data message indicates that the first call resulted in an operator intercept; and connecting the calling telephone user equipment to the second call.

5. The method of claim 1 further comprising the step of transmitting a recorded message generated by the first telecommunications node to the calling telephone user equipment, the content of the message conveying that there is no answer at the called telephone, when the data message indicates that the call to the called telephone user equipment has not been answered for a predetermined amount of time.

6. The method of claim 1, wherein the call from the second telecommunications node to the first telecommunications node comprises a predesignated routing path for connecting a call between the calling telephone user equipment and the called telephone user equipment, and further comprising the step of:

identifying a routing path for the call between the calling telephone user equipment and the called telephone user equipment, wherein the step of identifying comprises the step of retrieving the predesignated routing path from memory when the call from the calling telephone user equipment to the called telephone user equipment is placed.

7. A method of connecting a calling telephone user equipment to a called telephone user equipment comprising:

signalling a telephone switch to place a call to the called telephone user equipment;

signalling the telephone switch to place a call to a telecommunication node;

signalling the telecommunication node an indication of the result of the call to the called telephone user equipment;

answering the call to the telecommunication node when the indication is that the call to the called telephone user equipment has been answered; and connecting the calling telephone user equipment to the called telephone user equipment via the call to the called telephone user equipment, the call to the telecommunication node, and a connection between the calling telephone user equipment and the telecommunication node.

8. The method of claim 6 further comprising the step of connecting the calling telephone user equipment to the called telephone user equipment when the indication is that the call from the telephone switch to the called telephone user equipment has been answered.

9. The method of claim 7 further comprising the step of transmitting a recorded busy signal tone generated by the telecommunication node to the calling telephone user equipment when the indication is that the called telephone is busy.

10. The method of claim 7 further comprising the steps of signalling a second telephone switch to place a second call to the called telephone user equipment when the indication is that the first call to the called telephone user equipment resulted in an operator intercept; and connecting the calling telephone user equipment to the second call.

11. The method of claim 7 wherein the telephone switch is part of a telephone network and the signal to the telecommunication node is transmitted via a data line external to the telephone network.

12. A method for connecting a call from a calling telephone user equipment to a called telephone user equipment comprising the steps of:

establishing a first connection between the calling telephone user equipment and a first telecommunication node;

identifying a routing path for the call;

transmitting a first data message from the first telecommunication node to a server node, the data message requesting establishment of the routing path;

transmitting a first set of data messages, one data message from the set being transmitted to each calling node in the routing path, the message instructing each calling node to place a call to an associated called node, the set comprising at least one data message;

placing a first set of calls, one call from the set being placed by each calling node to its associated called node, the set comprising at least one call;

transmitting a second data message to a second telecommunication node, the message instructing the second telecommunication node to place a call to the called telephone user equipment;

placing a call from the second telecommunication node to the called telephone user equipment;

receiving at the second telecommunication node an indication of the result of the call placed to the called telephone user equipment;

transmitting a third data message from the second telecommunication node to the server node, the content of the message being reflective of the indication;

transmitting a second set of data messages when the third data message indicates that the call from the second telecommunication node to the called telephone user equipment has been answered, one data message from the second set being transmitted to each called node in the routing path, the message instructing the called node to answer the call from its associated calling node, the second set comprising at least one data message;

answering the first set of calls upon receipt of the second set of data messages.

13. The method of claim 12 wherein the routing path is a cost-efficient routing path.

14. The method of claim 12 wherein the routing path for the call is predesignated before the call is placed, and wherein the step of identifying a routing path for the call comprises the step of retrieving the predesignated routing path from memory when the call is placed.

15. The method of claim 12 wherein the step of identifying a routing path for the call comprises the step of determining a routing path for the call after the call is placed.

16. A method for connecting a call from a calling telephone user equipment to a called telephone user equipment comprising the steps of:

establishing a connection between the calling telephone user equipment and an originating node;

transmitting a data message from the originating node to a transit node remote from the originating node via a data line, the data message comprising the telephone number of the originating node and the telephone number of the called telephone user equipment;

placing a call from the transit node to the originating node;

placing a call from the transit node to a terminating node;

transmitting to the terminating node a data message via a data line comprising the telephone number of the called telephone user equipment;

placing a call from the terminating node to the called telephone user equipment;

receiving at the terminating node an indication of the result of the call placed to the called telephone user equipment;

answering the call from the transit node to the terminating node when the indication is that the call from the terminating node to the called telephone user equipment has been answered;

transmitting a data message to the originating node via a data line, the content of the data message being reflective of the indication;

answering the call from the transit node to the originating node when the data message indicates that the call from the terminating node to the called telephone user equipment has been answered.

17. A method of connecting a telephone call to a called telephone user equipment comprising:

receiving a data message at a terminating node via a data line, the data message comprising the telephone number of the called telephone user equipment;

placing a call from the terminating node to a remote originating node;

placing a call from the terminating node to the called telephone user equipment;

receiving at the terminating node an indication of the result of the call placed to the called telephone user equipment;

transmitting a data message from the terminating node to the originating node via a data line, the content of the data message being reflective of the indication.

18. A method for connecting a call using a telecommunications node comprising:

establishing a connection between a calling telephone user equipment and the telecommunications node;

sending a first data message by the telecommunications node to remote equipment, the first data message comprising telephone number of a called telephone user equipment;

receiving a second data message at the telecommunications node from the remote equipment, the second data message indicating a result of a cell placed to the called telephone user equipment by the remote equipment; and answering a call from the remote equipment that had been placed to the telecommunication node when the second data message, received at the telecommunications node from the remote equipment, indicates that the call from the remote equipment to the called telephone user equipment has been answered.

19. The method of claim 18 further comprising the step of transmitting a recorded busy signal tone generated by the telecommunications node to the calling telephone user equipment when the second data message from the remote equipment indicates that the called telephone user equipment is busy.

20. The method of claim 18 further comprising the step of, if the call to the called telephone user equipment has not been answered, playing a recorded message generated by the telecommunications node to the calling telephone user equipment, the content of the message conveying that there is no answer at the called telephone user equipment when the second data message indicates that there is no answer at the called telephone user equipment.

21. A method for connecting a call from a calling telephone user equipment to a called telephone user equipment comprising the steps of:

establishing a connection between the calling telephone user equipment and an originating node;

sending a first data message from the originating node to a transit node remote from the originating node, the first data message comprising the telephone number of the originating node and the telephone number of the called telephone user equipment;

receiving, but not answering, a call at the originating node that has been placed by the transit node;

receiving a second data message at the originating node, the second data message indicating whether the call from a terminating node to the called telephone user equipment has been answered; and answering the call from the transit node to the originating node when the second data message indicates that the call from the terminating node to the called telephone user equipment has been answered.

* * * * *